(12) United States Patent
Geurts et al.

(10) Patent No.: US 9,900,481 B2
(45) Date of Patent: Feb. 20, 2018

(54) IMAGING PIXELS HAVING COUPLED GATE STRUCTURE

(71) Applicant: SEMICONDUCTOR COMPONENTS INDUSTRIES, LLC, Phoenix, AZ (US)

(72) Inventors: Tomas Geurts, Haasrode (BE); Richard Scott Johnson, Boise, ID (US); Manuel Innocent, Wezemaal (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/140,038

(22) Filed: Apr. 27, 2016

(65) Prior Publication Data

US 2017/0150017 A1    May 25, 2017

Related U.S. Application Data

(60) Provisional application No. 62/259,822, filed on Nov. 25, 2015.

(51) Int. Cl.
| | |
|---|---|
| *H04N 5/225* | (2006.01) |
| *H04N 5/369* | (2011.01) |
| *H04N 5/372* | (2011.01) |
| *H04N 5/376* | (2011.01) |
| *H04N 5/235* | (2006.01) |

(52) U.S. Cl.
CPC ......... *H04N 5/2253* (2013.01); *H04N 5/2355* (2013.01); *H04N 5/3698* (2013.01); *H04N 5/372* (2013.01); *H04N 5/3765* (2013.01)

(58) Field of Classification Search
CPC .. H04N 5/2253; H04N 5/2355; H04N 5/3765; H04N 5/372; H04N 5/3698
See application file for complete search history.

(56) References Cited

U.S. PATENT DOCUMENTS

| | | | |
|---|---|---|---|
| 7,332,786 B2 | 2/2008 | Altice et al. | |
| 7,884,402 B2 | 2/2011 | Ki | |
| 8,089,036 B2 * | 1/2012 | Manabe | H04N 5/353 |
| | | | 250/208.1 |
| 8,866,059 B2 * | 10/2014 | Murata | H01L 27/14603 |
| | | | 250/208.1 |
| 9,118,883 B2 | 8/2015 | Wan | |

(Continued)

*Primary Examiner* — Luong T Nguyen
(74) *Attorney, Agent, or Firm* — Treyz Law Group, P.C.; David K. Cole

(57) ABSTRACT

An image sensor may include one or more pixels having a coupled gate structure that may selectively route overflow charge from a photodiode to increase the dynamic range of the pixel. The coupled gate structure may include two, three or four transistors. During charge accumulation in the pixel, overflow charge may pass from a photodiode to the coupled gate structure to be selectively routed to one of a plurality of paths. Timing of control signals for a subset of the transistors in the coupled gate structure may alternate such that only one transistor is active to pass charge to one of the plurality of paths at any given time. Depending on the selected path, overflow charge may be routed to a pixel voltage supply or to one or more storage nodes in the pixel. Pixels may also include a dual-gain structure, which may provide additional charge storage capacity.

17 Claims, 21 Drawing Sheets

(56) References Cited

U.S. PATENT DOCUMENTS

| | | | |
|---|---|---|---|
| 9,313,428 B2* | 4/2016 | Borremans | H04N 5/3559 |
| 2004/0239154 A1* | 12/2004 | Ekornes | A47C 1/036 |
| | | | 297/61 |
| 2007/0035649 A1* | 2/2007 | McKee | H01L 27/14609 |
| | | | 348/308 |
| 2009/0045319 A1* | 2/2009 | Sugawa | H01L 27/14609 |
| | | | 250/208.1 |
| 2009/0108176 A1 | 4/2009 | Blanquart | |

* cited by examiner

IMAGING PIXELS HAVING COUPLED GATE STRUCTURE

CROSS-REFERENCE TO RELATED APPLICATION(S)

This application claims priority to U.S. Provisional Application No. 62/259,822, filed on Nov. 25, 2015, entitled "Imaging Pixels Having Coupled Gate Structure," invented by Tomas Geurts, Richard Scott Johnson and Manuel Innocent, and is incorporated herein by reference and priority thereto for common subject matter is hereby claimed.

BACKGROUND

This relates generally to imaging sensors, and more particularly, to imaging sensors with pixels that include a coupled gate structure for high dynamic range imaging.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

Conventional imaging systems also may have images with artifacts associated with low dynamic range. Scenes with bright and dark portions may produce artifacts in conventional image sensors, as portions of the image may be over exposed or under exposed.

It would therefore be desirable to be able to provide high dynamic range (HDR) imaging systems for capturing images with minimized artifacts related to moving objects, moving or shaking camera, flickering lighting, and objects with changing illumination.

DETAILED DESCRIPTION

Figure 1:
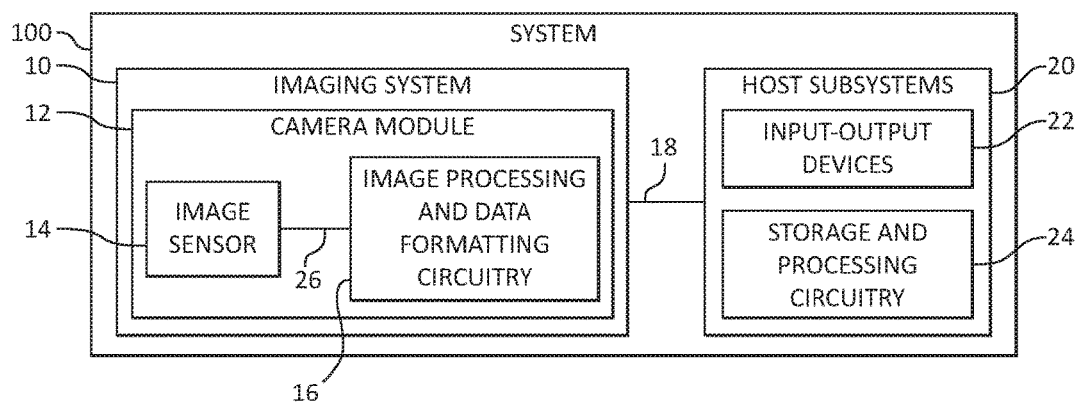
FIG. 1 is a diagram of an illustrative system that includes an imaging system and a host subsystem in accordance with an embodiment.

Embodiments of the present invention relate to image sensors, and more particularly, to image sensors having pixels that each contain coupled gate structures for high dynamic range imaging. It will be recognized by one skilled in the art, that the present exemplary embodiments may be practiced without some or all of these specific details. In other instances, well-known operations have not been described in detail in order not to unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

In some conditions, such as high light conditions, more charge may accumulate in a photodiode of an image sensor pixel than can be stored within the pixel. For instance, storage nodes or photodiodes in a pixel may only be capable of storing a limited amount of charge. This limited charge storage capacity may reduce the dynamic range of the pixel, which is undesirable. In order to overcome this dynamic range limitation, it may be desirable to include a mechanism within a pixel for steering some charge to either extra storage nodes in the pixel or to a pixel voltage supply. This charge steering may be accomplished, for instance, by setting the voltage of one or more transistors coupled to the photodiode at an intermediate level during charge accumulation. By partially activating the transistor(s) in this way, excess charge (sometimes referred to herein as overflow charge) may be routed from the photodiode to one or more storage nodes or to the pixel voltage supply.

Overflow charges that are routed to the pixel voltage supply are disposed of. Such disposal of charges may be performed in a manner such that the amount of charge disposed is known, which may be accounted for by downstream processing circuitry. Overflow charges that are routed to the storage node(s) may be read out separately from non-overflow charges. The magnitude of the overflow charge signal that is read out may be a known fraction of the total overflow charge. Thus, a portion of the charge accumulated in the photodiode may be kept track of by the image sensor without the need for storing said charge, thereby increasing the dynamic range of the pixel.

In some configurations, overflow charges may not be routed to the pixel voltage supply and may instead be routed to multiple storage nodes. In such configurations, overflow charges may also be read out separately from non-overflow charges. By performing separate readout of overflow charges and non-overflow charges, the dynamic range of the pixel may be increased. The method of overflow and non-overflow charge read out operations is not described in detail in order not to unnecessarily obscure the present embodiments.

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc. During operation of imaging system 10, camera module 12 may continuously capture and provide image frames to host subsystem 20.

Figure 2:
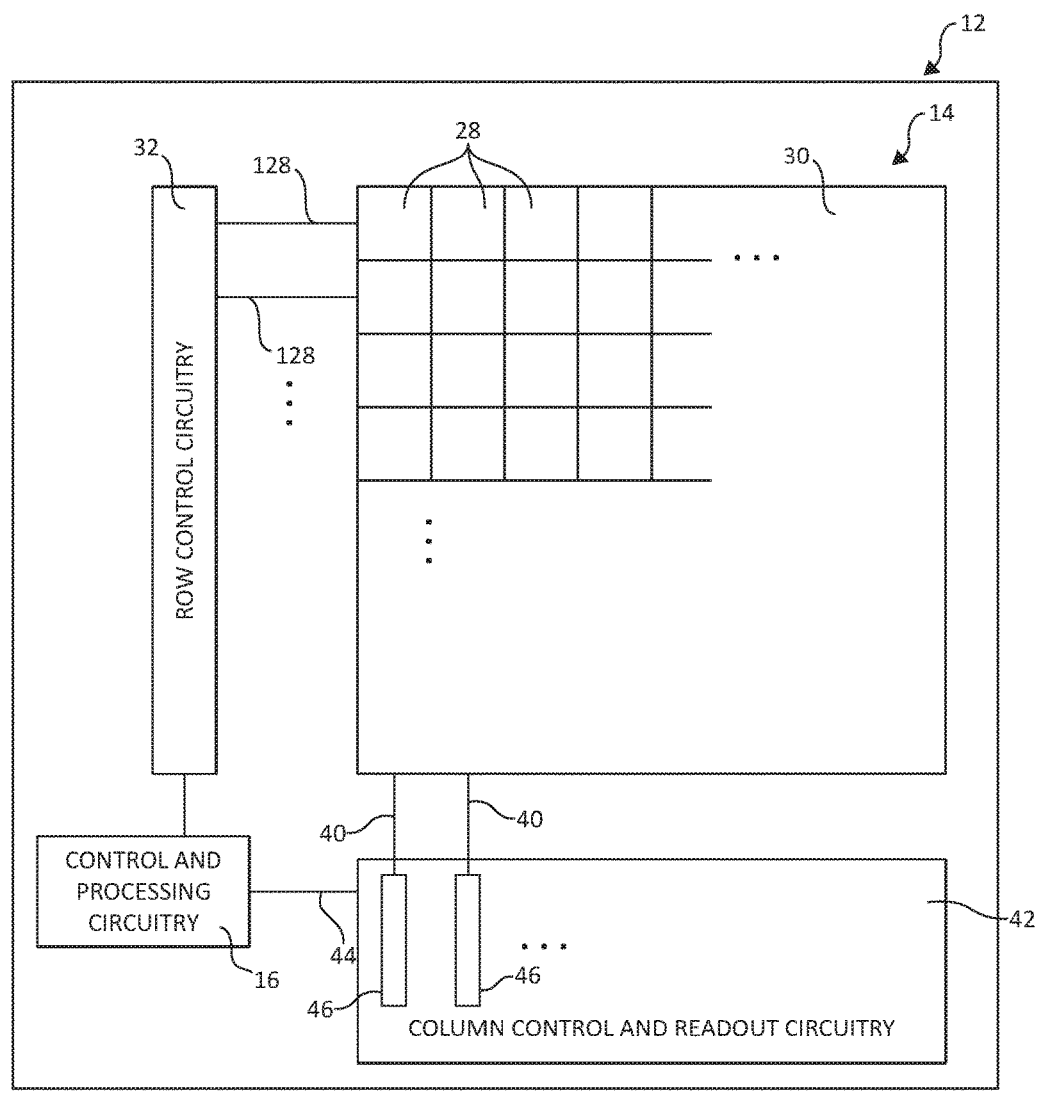
FIG. 2 is a diagram of an illustrative image sensor having an array of image pixels and control circuitry coupled to the array of image pixels in accordance with an embodiment.

An example of an arrangement for camera module 12 is shown in FIG. 2. As shown in FIG. 2, camera module 12 includes image sensor 14 and control and processing circuitry 16. Image sensor 14 may include a pixel array such as array 30 of pixels 28 (sometimes referred to herein as image sensor pixels or image pixels 28). Control circuitry 16 may be coupled to row control circuitry 32 and may be coupled to column control and readout circuitry 42 via global data path 44. Row control circuitry 32 may receive row addresses from control circuitry 16 and may supply corresponding row control signals to image pixels 28 over control paths 128 (e.g., dual conversion gain control signals, pixel reset control signals, charge transfer control signals, blooming control signals, row select control signals, or any other desired pixel control signals). Column control and readout circuitry 42 may be coupled to the columns of pixel array 30 via one or more conductive lines such as column lines 40. Column lines 40 may be coupled to each column of image pixels 28 in image pixel array 30 (e.g., each column of pixels may be coupled to a corresponding column line 40). Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out by circuitry 42 on column lines 40.

Column control and readout circuitry 42 may include a number of column readout circuits 46. Each column readout circuit 46 may be coupled to a corresponding column line 40 and may read out and receive image signals from pixels 28 coupled to the corresponding column line. Each column readout circuit 46 may include column circuitry such as a column amplifier for amplifying signals read out from array 20, sample and hold circuitry for sampling and storing signals read out from array 20, analog-to-digital converter (ADC) circuit for converting read out analog signals to corresponding digital signals, and column memory for storing the read out signals and any other desired data. Column readout circuits 46 may output digital pixel values to control and processing circuitry 16 over line 44.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Figure 3:
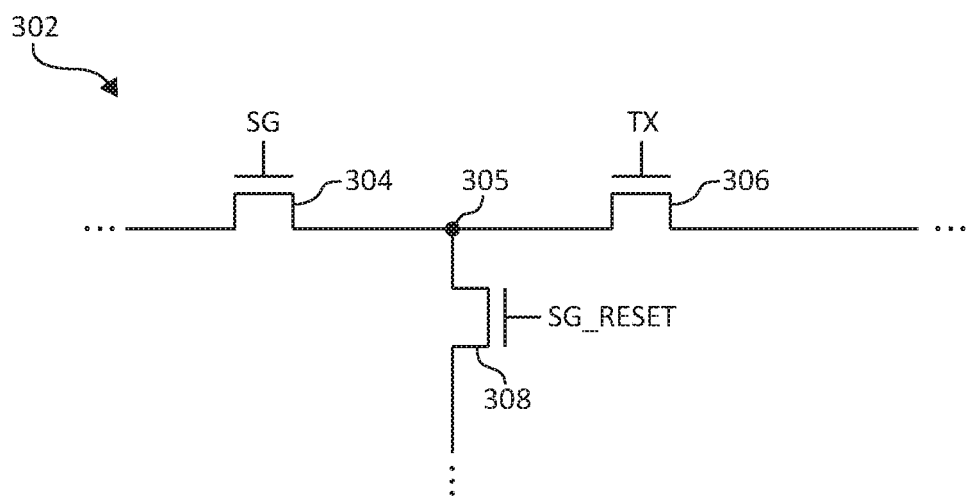
FIG. 3 is a diagram of an illustrative coupled gate structure circuit in accordance with an embodiment.

FIG. 3 is a circuit diagram of a 3-transistor coupled gate structure that may be incorporated in a pixel 28 of array 30 of FIG. 2. Coupled gate structure 302 may include a storage gate transistor 304 (sometimes referred to herein as a threshold transistor or a storage gate), a storage node 305 (sometimes referred to herein as a temporary storage node), a transfer transistor 306, and a storage node reset transistor 308. Storage gate 304 may be coupled to a photodiode or to a storage node other than storage node 305. Storage node 305 may be a pinned storage node that is fully depletable (e.g., all charge may be removed from storage node 305 during charge transfer). The coupled gates may function as a charge coupled device structure. Storage node reset transistor 308 may be coupled to a pixel voltage supply or to a storage node other than storage node 305. Transfer transistor 306 may be coupled to a floating diffusion node or to a storage node other than storage node 305.

During charge accumulation in the photodiode of the pixel, storage gate 304 may receive a signal SG that is at an intermediate voltage level in order to allow some, but not all, charge to overflow from the photodiode or from a storage node through storage gate 304 to temporary storage node 305. Transfer transistor 306 and storage node reset transistor 308 may receive alternating signals TX and SG_RESET, such that overflow charges in temporary storage node 305 are passed either through transfer transistor 306 or through storage node reset transistor 308.

Figure 4:
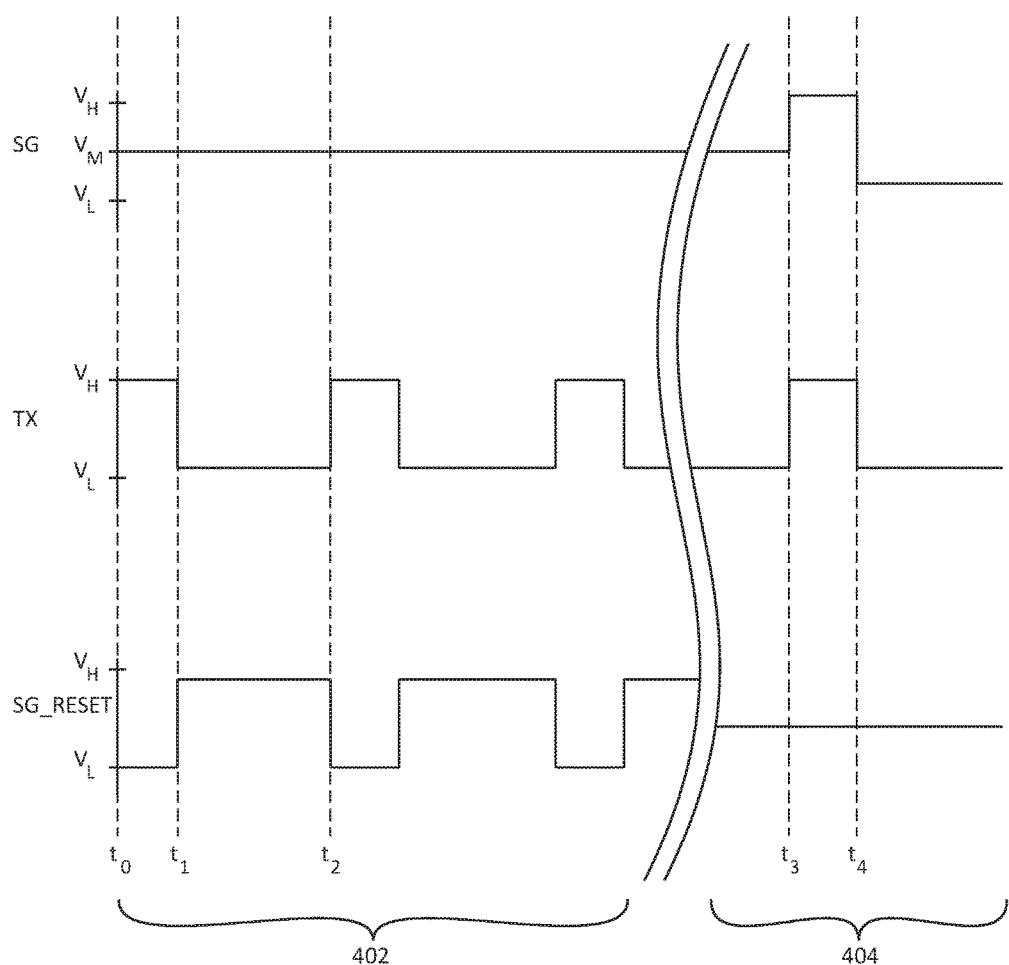
FIG. 4 is a timing diagram showing relevant signal behavior in an illustrative 3-transistor coupled gate structure in accordance with an embodiment.

FIG. 4 is a timing diagram showing relevant signal behavior that may be used in coupled gate structure 302 of FIG. 3 for overflow charge routing and non-overflow charge transfer. Region 402 of the timing diagram represents signal behavior during a portion of the charge accumulation period of a pixel photodiode. During the charge accumulation period, signal SG may be held at intermediate voltage level $V_M$, while signals TX and SG_RESET may alternate between respective low and high voltage levels $V_L$ and $V_H$. It should be noted that signal SG_RESET may be at a low voltage whenever signal TX is at a high voltage and vice-versa. In other words, signals SG_RESET and TX may have alternating waveforms during charge accumulation. For example, from time $t_0$ to $t_1$, signal TX is at $V_H$ and signal SG_RESET is at $V_L$. From time $t_1$ to $t_2$, signal TX is at $V_L$ and signal SG_RESET is at $V_H$. The duty cycle of the TX and SG_RESET signals may be altered based on the portion of overflow charges desired to be routed to either of the two paths. The duty cycle may, for example, be set such that signal TX is approximately 12.5% of a period and signal SG_RESET is on for approximately 87.5% of the period. It should be noted that, during charge integration, signal TX and signal SG_RESET may be complementary signals or, if desired, there may be periods of time between assertions of signal TX and signal SG_RESET in which both signals are deasserted.

Portion 404 of the timing diagram represents signal behavior when non-overflow charges are transferred from the photodiode to storage. Portion 404 may occur after the read out of overflow signals from the pixel. From time $t_3$ to time $t_4$, signals SG and TX may be at $V_H$, while signal SG_RESET is held low, such that non-overflow charge from the photodiode is only transferred along one desired path (e.g., through transfer transistor 306 in FIG. 3).

Figure 5:
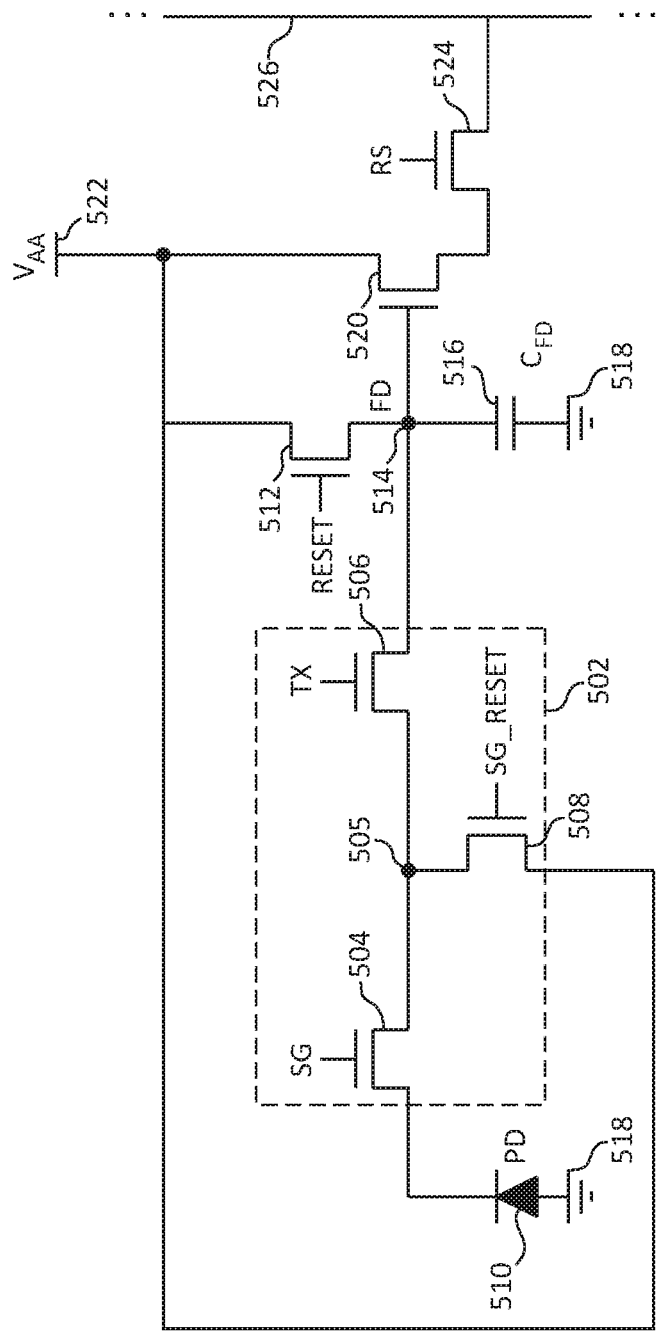
FIG. 5 is a diagram of an illustrative image sensor pixel circuit having a coupled gate structure adjacent to a photodiode, where one transistor of the coupled gate structure is coupled to a pixel voltage supply and another transistor of the coupled gate structure is coupled to a floating diffusion node in accordance with an embodiment.

FIG. 5 is a diagram of a pixel circuit that includes a 3-transistor coupled gate structure which may be similar to coupled gate structure 302 in FIG. 3. Coupled gate structure 502 may include storage gate 504, temporary storage node 505, transfer transistor 506, and storage gate reset transistor 508. The arrangement and operation of coupled gate structure 502 may be similar to that described above in connection with the coupled gate structure 302 in FIG. 3. Storage gate 504 may be coupled to photodiode 510. Storage node 505 may be a pinned storage node that is fully depletable (e.g., all charge may be removed from storage node 505 during charge transfer). The coupled gates structure may work like a charge coupled device structure. Photodiode 510 may be coupled to ground 518. A floating diffusion node (FD) 514 may be coupled between transfer transistor 506 and a gate of source-follower transistor 520. There may be a capacitance ($C_{FD}$) 516 between the floating diffusion node 514 and ground 518. Reset transistor 512 may be coupled between pixel voltage supply 522 and floating diffusion node 514. Storage gate reset transistor 508 may be coupled between temporary storage node 505 and pixel voltage supply 522. Pixel voltage supply 522 may receive voltage $V_{AA}$. Source-follower transistor 520 may be coupled between pixel voltage supply 522 and row select transistor 524. Row select transistor 524 may be coupled to column output line 526.

Signals SG, TX, and SG_RESET may respectively behave according to the timing diagrams for signals SG, TX, and SG_RESET of FIG. 4. Reset transistor 512 may receive signal RESET, which may activate reset transistor 512 during reset operations to pass voltage $V_{AA}$ to floating diffusion node 514. Row select transistor 524 may receive signal RS, which may activate row select transistor 524 to transfer a voltage that corresponds to the charge on the floating diffusion node to column readout circuitry 526 during readout operations.

Figure 6:
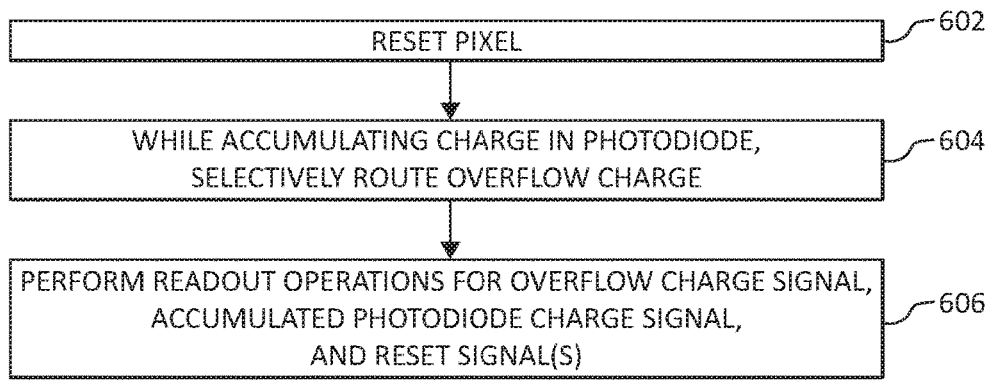
FIG. 6 is a flow chart of illustrative steps that may be performed by an image sensor for capturing and reading out signals in an image sensor pixel in accordance with an embodiment.

FIG. 6 is a flow chart showing the basic operation of an image sensor pixel such as the image pixel shown in FIG. 5. In step 602, the pixel may be reset. In some embodiments, this may be accomplished by simultaneously pulsing signals RESET, TX, and SG to respectively activate a reset transistor, a transfer transistor, and a storage gate transistor (e.g., rest transistor 512, transfer transistor 506, and storage gate transistor 504 in FIG. 5) such that the floating diffusion node (e.g., floating diffusion node 514 in FIG. 5) and the photodiode (e.g., photodiode 510 in FIG. 5) are set to a reset voltage (e.g., voltage $V_{AA}$ in FIG. 5). In other embodiments, other transistors may be activated during the reset operation as well in order to reset additional storage nodes in the pixel.

In step 604, charge may begin accumulating in the photodiode while any overflow charge is selectively routed. The details of the selective routing of overflow charge in step 604 may change depending on the embodiment being used. Various selective overflow charge routing configurations that may be used are described in more detail in connection with specific embodiments below.

In step 606, readout operations may be performed for various signals including, but not limited to, an overflow charge signal corresponding to overflow charge transferred during step 604, an accumulated photodiode charge signal corresponding to non-overflow charge transferred to the floating diffusion node (and, if desired, other storage nodes) after the read out of the overflow charge signal, and one or more reset signals that may correspond to charge stored after reset operations. For example, once the overflow charge signal is read out, correlated double sampling (CDS) operations may be performed to read out a signal corresponding to the remaining accumulated photodiode charge and one or more reset signals, after which the signals may be recombined (e.g., linearly recombined). Other configurations, such as dual-gain configurations, may require the read out of additional signals, but are not described here so as not to obscure the present embodiments.

Figure 7:
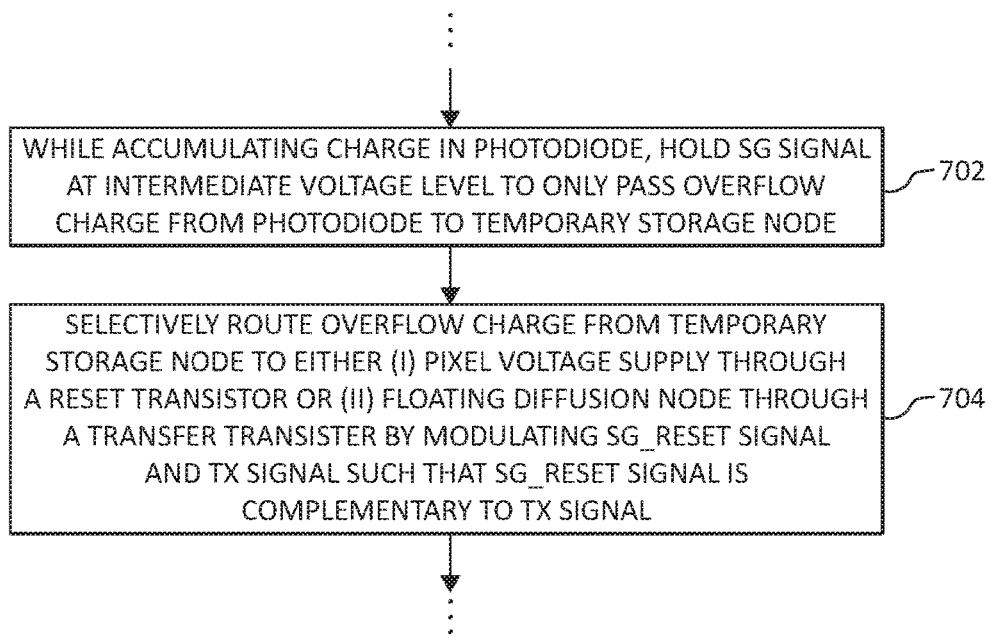
FIG. 7 is a flow chart of illustrative steps that may be performed by the image sensor pixel of FIG. 5 to selectively route overflow charge from a photodiode during charge accumulation in accordance with an embodiment.

FIG. 7 is a flow chart of steps that may be performed in place of step 604 in FIG. 6 for selectively routing overflow charge while charge is accumulating in the photodiode. The flow chart of FIG. 7 may correspond to an image sensor pixel configuration such as the one shown in FIG. 5. In step 702, signal SG may be held at an intermediate voltage level such that overflow charge is allowed to pass from photodiode 510 through storage gate 504 to temporary storage node 505.

In step 704, overflow charge may be selectively routed from temporary storage node 504 either to pixel voltage supply 522 through storage gate reset transistor 508 or to floating diffusion node 514 through transfer transistor 506. This selective routing may be performed by modulating signal SG_RESET and signal TX such that the two signals alternate (e.g., when SG_RESET is high, TX is low, and vice versa).

Figure 8:
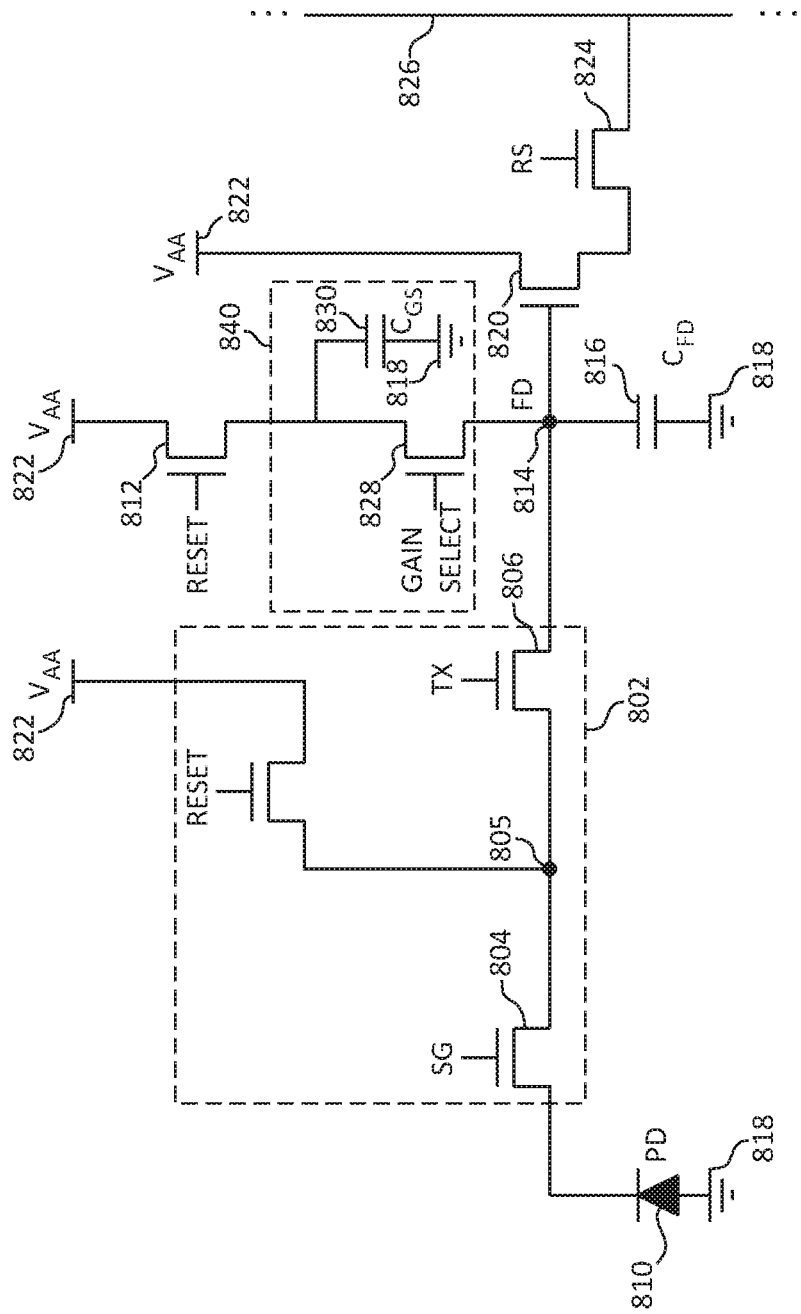
FIG. 8 is a diagram of an illustrative image sensor pixel circuit having a coupled gate structure adjacent to a photodiode and having a dual-gain structure, where one transistor of the coupled gate structure is coupled to a pixel voltage supply and another transistor of the coupled gate structure is coupled to a floating diffusion node in accordance with an embodiment.

FIG. 8 is a diagram of a pixel circuit that includes a 3-transistor coupled gate structure which may be similar to coupled gate structure 302 in FIG. 3 and that includes a dual-gain structure. Coupled gate structure 802 may include storage gate 804, temporary storage node 805, transfer transistor 806, and storage gate reset transistor 808. The arrangement and operation of coupled gate structure 802 may be similar to that described above in connection with the coupled gate structure 302 in FIG. 3. Storage gate 804 may be coupled to photodiode 810. Storage node 805 may be a pinned storage node that is fully depletable (e.g., all charge may be removed from storage node 805 during charge transfer). The coupled gate structure 802 may work like a charge coupled device structure. Photodiode 810 may be coupled to ground 818. A floating diffusion node (FD) 814 may be coupled between transfer transistor 806 and a gate of source-follower transistor 820. There may be a capacitance ($C_{FD}$) 816 between the floating diffusion node 814 and ground 818. Dual-gain structure 840 may include gain-select transistor 828 and gain-select capacitor ($C_{GS}$) 830. Reset transistor 812 may be coupled between pixel voltage supply 822 and gain-select transistor 828. Gain-select transistor 828 may be coupled to floating diffusion node 814. One terminal of gain-select capacitor 830 may be coupled between gain-select transistor 828 and reset transistor 812, while the other terminal of gain-select capacitor 830 may be coupled to ground 818. Storage gate reset transistor 808 may be coupled between temporary storage node 805 and pixel voltage supply 822. Pixel voltage supply 822 may receive voltage $V_{AA}$. Source-follower transistor 820 may be coupled between pixel voltage supply 822 and row select transistor 824. Row select transistor 824 may be coupled to column output line 826.

Signals SG, TX, and SG_RESET may respectively behave according to the timing diagrams for signals SG, TX, and SG_RESET of FIG. 4. Reset transistor 812 may receive signal RESET, which may activate reset transistor 812 during reset operations to pass voltage $V_{AA}$ to floating diffusion node 814. Row select transistor 824 may receive signal RS, which may activate row select transistor 824 to transfer a voltage that corresponds to the charge on the floating diffusion node to column readout circuitry 826 during readout operations. Gain-select transistor 828 may receive signal GAIN_SELECT, which may activate gain-select transistor 828 to connect gain-select capacitor 830 to floating diffusion node 814 to put the pixel in a low-gain configuration, or which may deactivate gain-select transistor 828 to isolate gain-select capacitor 830 from floating diffusion node 814 to put the pixel in a high-gain configuration.

Figure 9:
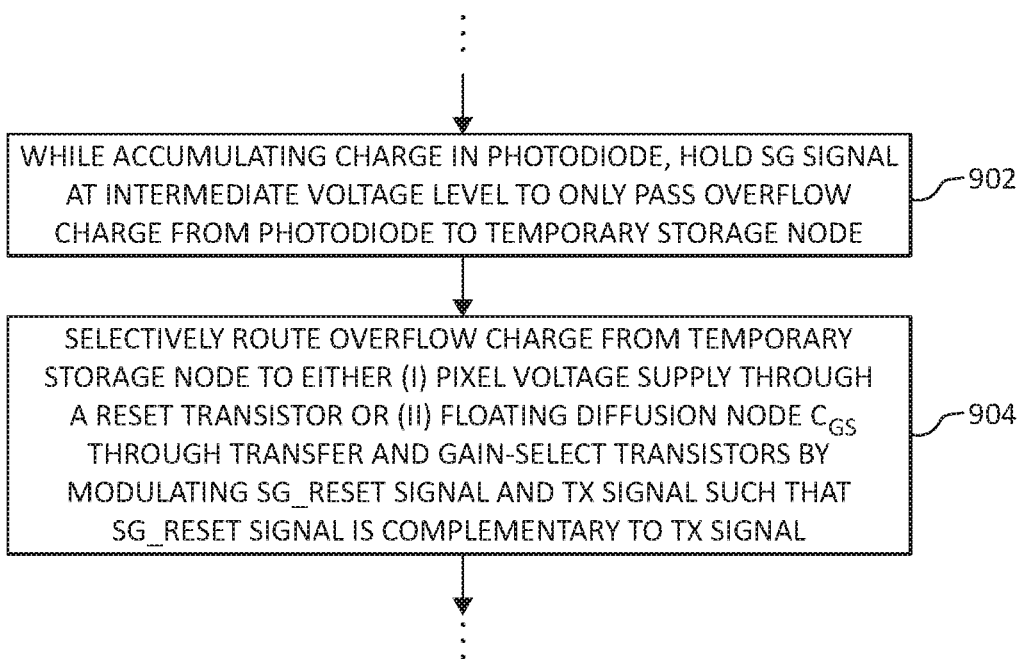
FIG. 9 is a flow chart of illustrative steps that may be performed by the image sensor pixel of FIG. 8 to selectively route overflow charge from a photodiode during charge accumulation in accordance with an embodiment.

FIG. 9 is a flow chart of steps that may be performed in place of step 604 in FIG. 6 for selectively routing overflow charge while charge is accumulating in the photodiode. The flow chart of FIG. 9 may correspond to an image sensor pixel configuration such as the one shown in FIG. 8. In step 802, signal SG may be held at an intermediate voltage level such that overflow charge is allowed to pass from photodiode 810 through storage gate 804 to temporary storage node 805.

In step 904, overflow charge may be selectively routed from temporary storage node 804 either to pixel voltage supply 822 through storage gate reset transistor 808 or to floating diffusion node 814 through transfer transistor 806 and gain-select capacitor ($C_{GS}$) 830 through gain-select transistor 828. This selective routing may be performed by modulating signal SG_RESET and signal TX such that the two signals alternate (e.g., when SG_RESET is high, TX is low, and vice versa).

Figure 10:
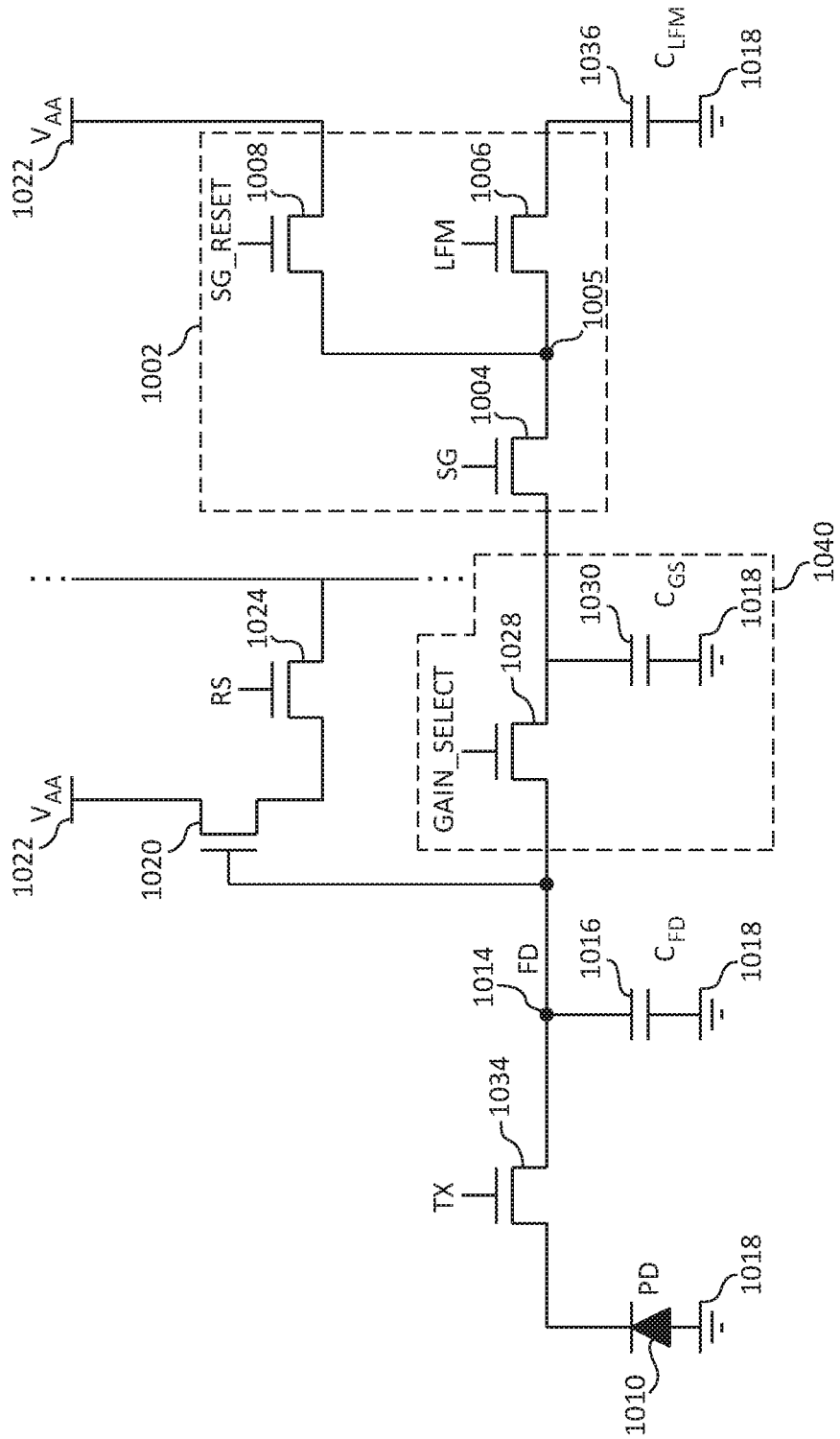
FIG. 10 is a diagram of an illustrative image sensor pixel circuit having a coupled gate structure and having a dual-gain structure interposed between the coupled gate structure and a floating diffusion node in accordance with an embodiment.

FIG. 10 is a diagram of a pixel circuit that includes a 3-transistor coupled gate structure which may be similar to coupled gate structure 302 in FIG. 3 and that includes a dual-gain structure. Coupled gate structure 1002 may include storage gate 1004, temporary storage node 1005, flicker mitigation transistor 1006, and storage gate reset transistor 1008. The arrangement and operation of coupled gate structure 1002 may be similar to that described above in connection with the coupled gate structure 1002 in FIG. 3. Transfer transistor 1034 may be coupled to photodiode 1010. Photodiode 1010 may be coupled to ground 1018. Floating diffusion node (FD) 1014 may be coupled between transfer transistor 1034 and a gate of source-follower transistor 1020. There may be a capacitance ($C_{FD}$) 1016 between the floating diffusion node 1014 and ground 1018. Dual-gain structure 1040 may include gain-select transistor 1028 and gain-select capacitor ($C_{GS}$) 1030. Gain-select transistor 1028 may be coupled between floating diffusion node 1014 and storage gate 1004. One terminal of gain-select capacitor 1030 may be coupled between gain-select transistor 1028 and storage gate 1004, while the other terminal of gain-select capacitor 1030 may be coupled to ground 1018. Storage gate reset transistor 1008 may be coupled between temporary storage node 1005 and pixel voltage supply 1022. Pixel voltage supply 1022 may receive voltage $V_{AA}$. Flicker mitigation transistor 1006 may be coupled between temporary storage node 1005 and flicker mitigation capacitor ($C_{LFM}$) 1036. Flicker mitigation capacitor 1036 may be coupled between flicker mitigation transistor 1006 and ground 1018. Source-follower transistor 1020 may be coupled between pixel voltage supply 1022 and row select transistor 1024. Row select transistor may be coupled to column output line 1026.

Signals SG, LFM, and SG_RESET may respectively behave according to the timing diagrams for signals SG, TX, and SG_RESET of FIG. 4. Storage gate reset transistor 1008 may receive signal SG_RESET, which may activate storage gate reset transistor 1008 during reset operations to pass voltage $V_{AA}$ to floating diffusion node 1014, gain-select capacitor 1030, and temporary storage node 1005. Storage node 1005 may be a pinned storage node that is fully depletable (e.g., all charge may be removed from storage node 1005 during charge transfer). The coupled gate structure 1002 may work like a charge coupled device structure. Row select transistor 1024 may receive signal RS, which may activate row select transistor 1024 to transfer a voltage that corresponds to the charge on the floating diffusion node to column readout circuitry 1026 during readout operations. Transfer transistor 1034 may receive signal TX. Gain-select transistor 1028 may receive signal GAIN_SELECT, which may activate gain-select transistor 1028 to connect gain-select capacitor 1030 to floating diffusion node 1014 to put the pixel in a low-gain configuration, or which may deactivate gain-select transistor 1028 to isolate gain-select capacitor 1030 from floating diffusion node 1014 to put the pixel in a high-gain configuration.

Figure 11:
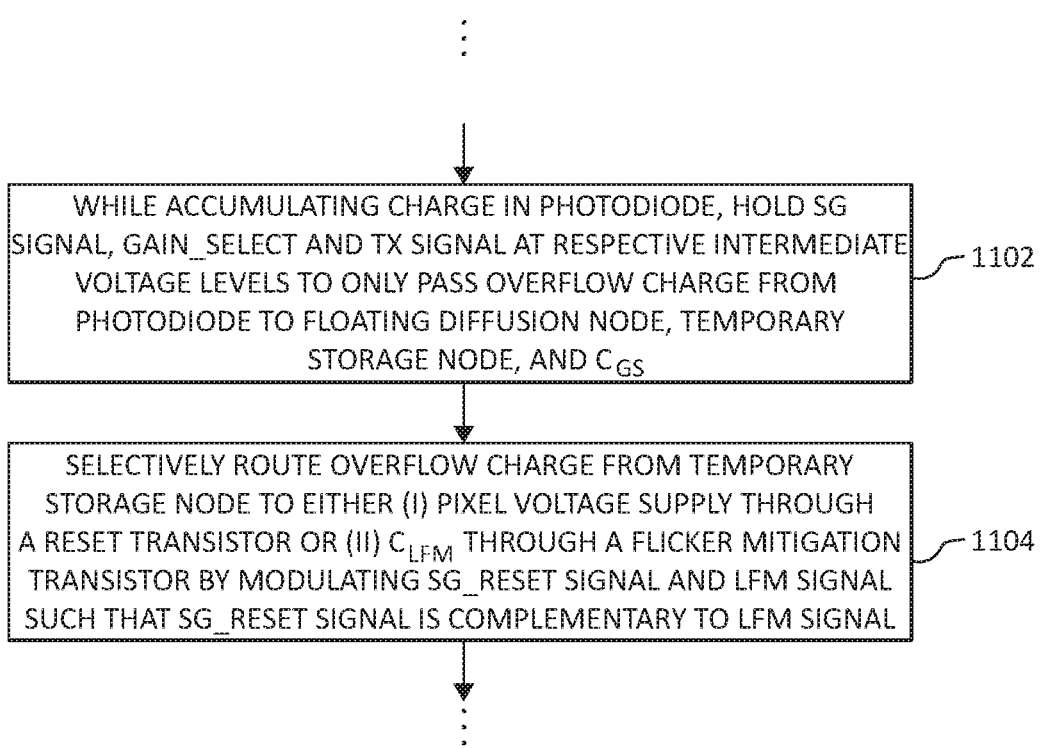
FIG. 11 is a flow chart of illustrative steps that may be performed by the image sensor pixel of FIG. 10 to selectively route overflow charge from a photodiode during charge accumulation in accordance with an embodiment.

FIG. 11 is a flow chart of steps that may be performed in place of step 604 in FIG. 6 for selectively routing overflow charge while charge is accumulating in the photodiode. The flow chart of FIG. 11 may correspond to an image sensor pixel configuration such as the one shown in FIG. 10. In step 1102, signals SG, GAIN_SELECT, and TX may be held at respective intermediate voltage levels such that overflow charge is allowed to pass from photodiode 1010 through transfer transistor 1034, gain-select transistor 1028, and storage gate 1004 to floating diffusion node 1014, gain-select capacitor 1030, and temporary storage node 1005.

In step 1104, overflow charge may be selectively routed from temporary storage node 1004 either to pixel voltage supply 1022 through storage gate reset transistor 1008 or to flicker mitigation capacitor 1036 through flicker mitigation transistor 1006. This selective routing may be performed by modulating signal SG_RESET and signal LFM such that the two signals alternate (e.g., when SG_RESET is high, LFM is low, and vice versa).

Figure 12:
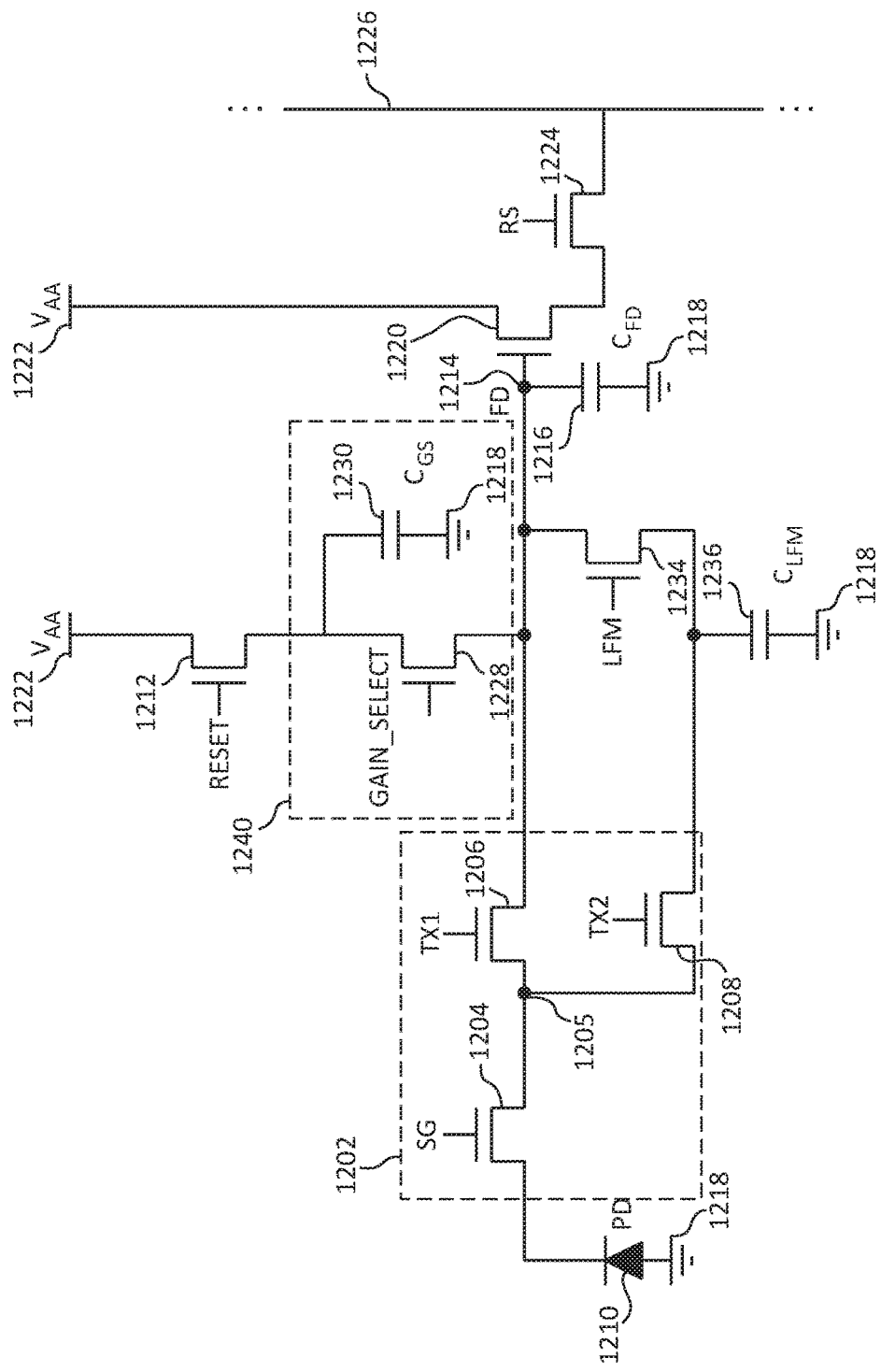
FIG. 12 is a diagram of an illustrative image sensor pixel circuit having a coupled gate structure adjacent to a photodiode and having a dual-gain structure, where one transistor of the coupled gate structure is coupled to a floating diffusion node and another transistor of the coupled gate structure is connected to a storage node in accordance with an embodiment.

FIG. 12 is a diagram of a pixel circuit that includes a 3-transistor coupled gate structure which may be similar to coupled gate structure 302 in FIG. 3 and that includes a dual-gain structure. Coupled gate structure 1202 may include storage gate 1204, temporary storage node 1205, first transfer transistor 1206, and second transfer transistor 1208. The arrangement and operation of coupled gate structure 1202 may be similar to that described above in connection with the coupled gate structure 302 in FIG. 3. Storage gate 1204 may be coupled to photodiode 1210. Storage node 1205 may be a pinned storage node that is fully depletable (e.g., all charge may be removed from storage node 1205 during charge transfer). The coupled gate structure 1202 may work like a charge coupled device structure. Photodiode 1210 may be coupled to ground 1218. A floating diffusion node (FD) 1214 may be coupled between first transfer transistor 1206 and a gate of source-follower transistor 1220. There may be a capacitance ($C_{FD}$) 1216 between the floating diffusion node 1214 and ground 1218. Dual-gain structure 1240 may include gain-select transistor 1228 and gain-select capacitor ($C_{GS}$) 1230. Reset transistor 1212 may be coupled between pixel voltage supply 1222 and gain-select transistor 1228. Pixel voltage supply 1222 may receive voltage $V_{AA}$. Gain-select transistor 1228 may be coupled to floating diffusion node 1214. One terminal of gain-select capacitor 1230 may be coupled between gain-select transistor 1228 and reset transistor 1212, while the other terminal of gain-select capacitor 1230 may be coupled to ground 1218. Flicker mitigation transistor 1234 may be coupled to floating diffusion node 1214. Second transfer transistor 1208 may be coupled between temporary storage node 1205 and flicker mitigation transistor 1234. Flicker mitigation capacitor 1236 may have a first terminal that is coupled between flicker mitigation transistor 1234 and second transfer transistor 1208. Flicker mitigation capacitor 1236 may have a second terminal that is coupled to ground 1218. Source-follower transistor 1220 may be coupled between pixel voltage supply 1222 and row select transistor 1224. Row select transistor 1224 may be coupled to column output line 1226.

Signals SG, TX1, and TX2 may respectively behave according to the timing diagrams for signals SG, TX, and SG_RESET of FIG. 4. Reset transistor 1212 may receive signal RESET, which may activate reset transistor 1212 during reset operations to pass voltage $V_{AA}$ to floating diffusion node 1214. Row select transistor 1224 may receive signal RS, which may activate row select transistor 1224 to transfer a voltage that corresponds to the charge on the floating diffusion node to column readout circuitry 1226 during readout operations. Gain-select transistor 1228 may receive signal GAIN_SELECT, which may activate gain-select transistor 1228 to connect gain-select capacitor 1230 to floating diffusion node 1214 to put the pixel in a low-gain configuration, or which may deactivate gain-select transistor 1228 to isolate gain-select capacitor 1230 from floating diffusion node 1214 to put the pixel in a high-gain configuration. Flicker mitigation transistor 1234 may receive signal LFM, which may activate flicker mitigation transistor 1234 to connect flicker mitigation capacitor 1236 to floating diffusion node 1214.

Figure 13:
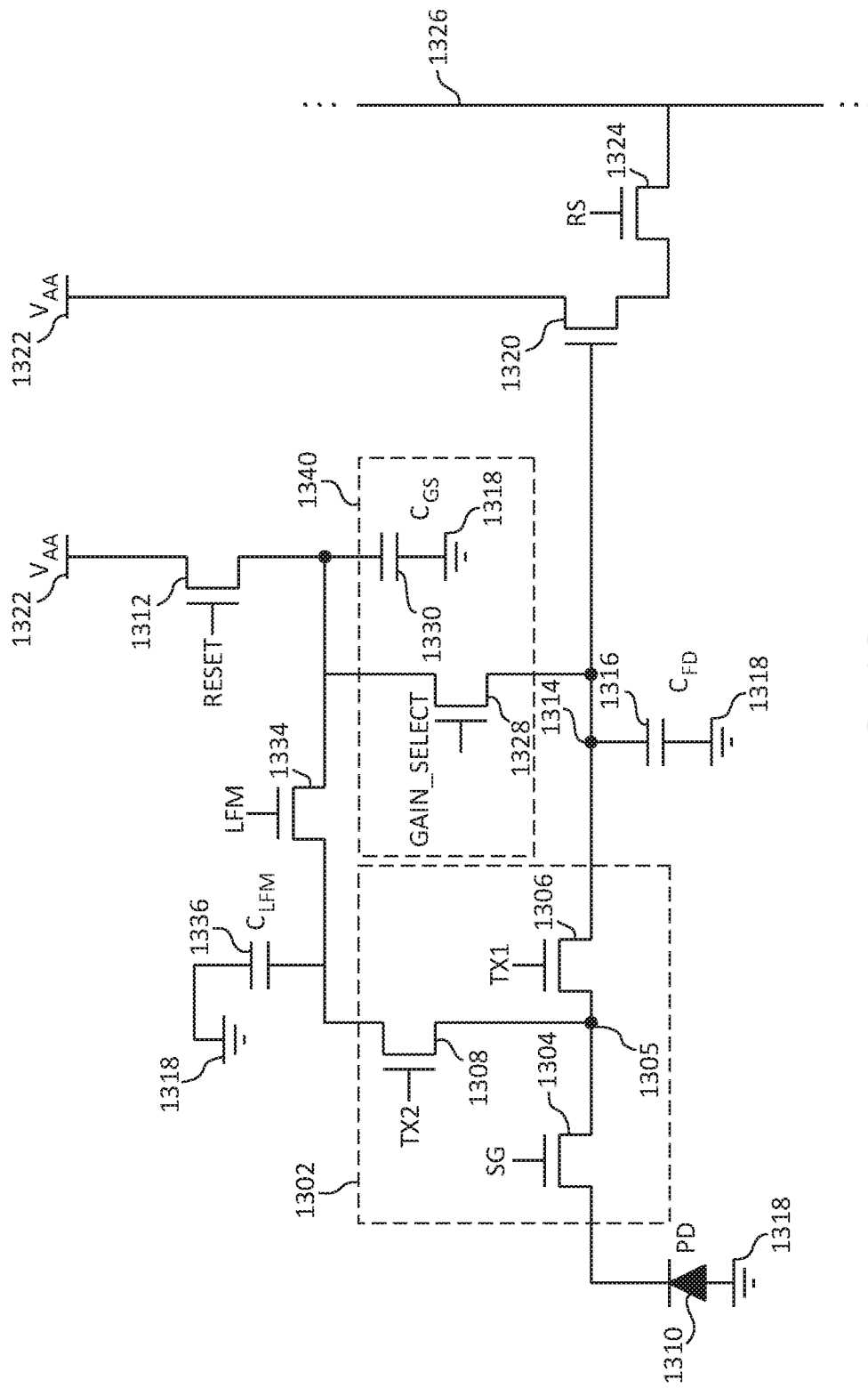
FIG. 13 is a diagram of an illustrative image sensor pixel circuit having a coupled gate structure adjacent to a photodiode and having a dual-gain structure, where one transistor of the coupled gate structure is coupled to a floating diffusion node and another transistor of the coupled gate structure is coupled to a storage node, and where the storage node is between the coupled gate structure and the dual-gain structure in accordance with an embodiment.

FIG. 13 is a diagram of a pixel circuit that includes a 3-transistor coupled gate structure which may be similar to coupled gate structure 302 in FIG. 3 and that includes a dual-gain structure. Coupled gate structure 1302 may include storage gate 1304, temporary storage node 1305, first transfer transistor 1306, and second transfer transistor 1308. The arrangement and operation of coupled gate structure 1302 may be similar to that described above in connection with the coupled gate structure 302 in FIG. 3. Storage gate 1304 may be coupled to photodiode 1310. Storage node 1305 may be a pinned storage node that is fully depletable (e.g., all charge may be removed from storage node 1305 during charge transfer). The coupled gate structure 1302 may work like a charge coupled device structure. Photodiode 1310 may be coupled to ground 1318. A floating diffusion node (FD) 1314 may be coupled between first transfer transistor 1306 and a gate of source-follower transistor 1320. There may be a capacitance ($C_{FD}$) 1316 between the floating diffusion node 1314 and ground 1318. Dual-gain structure 1340 may include gain-select transistor 1328 and gain-select capacitor ($C_{GS}$) 1330. Reset transistor 1312 may be coupled between pixel voltage supply 1322 and gain-select transistor 1328. Pixel voltage supply 1322 may receive voltage $V_{AA}$. Gain-select transistor 1328 may be coupled to floating diffusion node 1314. One terminal of gain-select capacitor 1330 may be coupled between gain-select transistor 1328 and reset transistor 1312, while the other terminal of gain-select capacitor 1330 may be coupled to ground 1318. One terminal of flicker mitigation transistor 1334 may be coupled to second transfer transistor 1308, while another terminal of flicker mitigation transistor 1334 may be coupled between reset transistor 1312 and gain-select transistor 1328. Second transfer transistor 1308 may be coupled between temporary storage node 1305 and flicker mitigation transistor 1334. Flicker mitigation capacitor 1336 may have a first terminal that is coupled between flicker mitigation transistor 1334 and second transfer transistor 1308. Flicker mitigation capacitor 1336 may have a second terminal that is coupled to ground 1318. Source-follower transistor 1320 may be coupled between pixel voltage supply 1322 and row select transistor 1324. Row select transistor 1324 may be coupled to column output line 1326.

Signals SG, TX1, and TX2 may respectively behave according to the timing diagrams for signals SG, TX, and SG_RESET of FIG. 4. Reset transistor 1312 may receive signal RESET, which may activate reset transistor 1312 during reset operations to pass voltage $V_{AA}$ to floating diffusion node 1314. Row select transistor 1324 may receive signal RS, which may activate row select transistor 1324 to transfer a voltage that corresponds to the charge on the floating diffusion node to column readout circuitry 1326 during readout operations. Gain-select transistor 1328 may receive signal GAIN_SELECT, which may activate gain-select transistor 1328 to connect gain-select capacitor 1330 to floating diffusion node 1314 to put the pixel in a low-gain configuration, or which may deactivate gain-select transistor 1328 to isolate gain-select capacitor 1330 from floating diffusion node 1314 to put the pixel in a high-gain configuration. Flicker mitigation transistor 1334 may receive signal LFM, which may activate flicker mitigation transistor 1334 to connect flicker mitigation capacitor 1336 to gain-select capacitor 1330.

Figure 14:
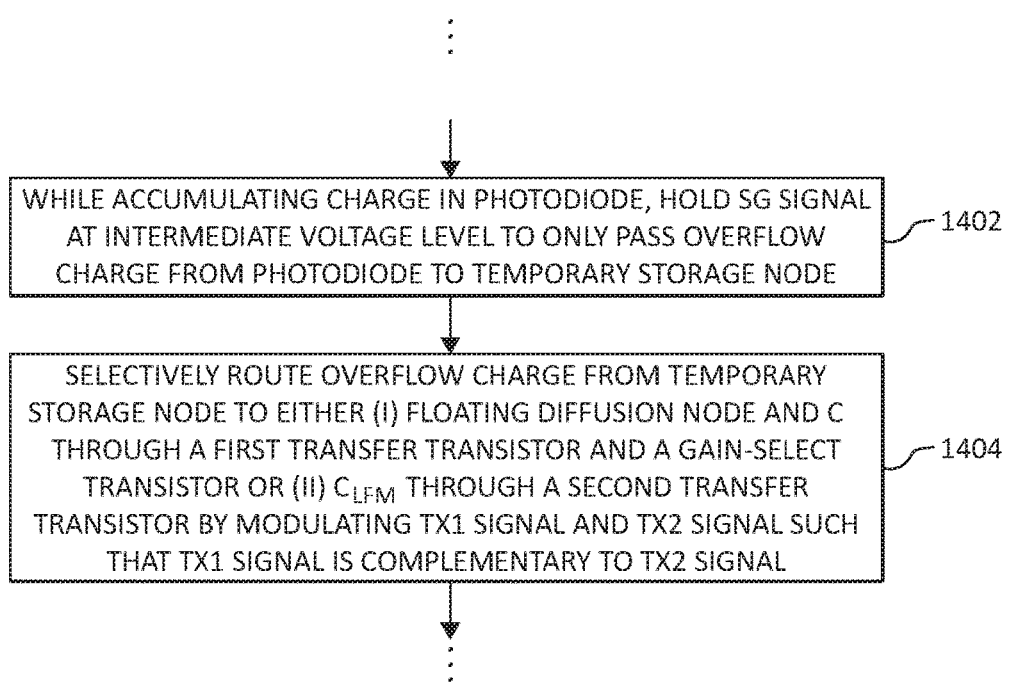
FIG. 14 is a flow chart of illustrative steps that may be performed by the image sensor pixels of FIGS. 12 and 13 to selectively route overflow charge from a photodiode during charge accumulation in accordance with an embodiment.

FIG. 14 is a flow chart of steps that may be performed in place of step 604 in FIG. 6 for selectively routing overflow charge while charge is accumulating in the photodiode. The flow chart of FIG. 14 may correspond to an image sensor pixel configuration such as those shown in FIGS. 12 and 13. In step 1402, signal SG may be held at an intermediate voltage level such that overflow charge is allowed to pass from photodiode 1210 through storage gate 1204 to temporary storage node 1205.

In step 1404, overflow charge may be selectively routed from temporary storage node 1204 either to floating diffusion node 1214 and gain-select capacitor 1230 respectively through first transfer transistor 1206 and gain-select transistor 1228 or to flicker mitigation capacitor 1236 through second transfer transistor 1208. This selective routing may be performed by modulating signal TX1 and signal TX2 such that the two signals alternate (e.g., when TX1 is high, TX2 is low, and vice versa).

Figure 15:
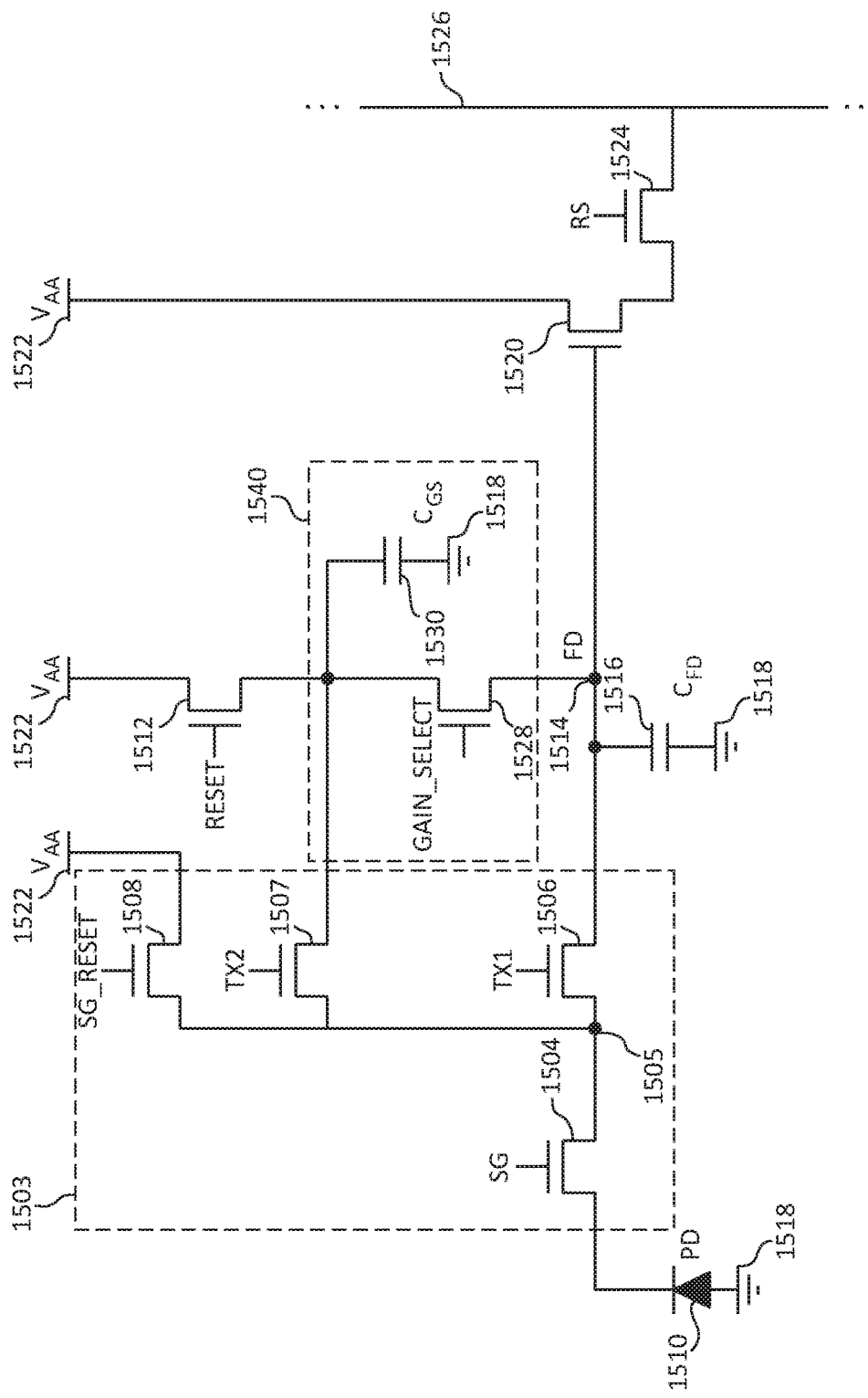
FIG. 15 is a diagram of an illustrative image sensor pixel circuit having a 4-transistor coupled gate structure in accordance with an embodiment.

FIG. 15 is a diagram of a pixel circuit that includes a 4-transistor coupled gate structure and that includes a dual-gain structure. Coupled gate structure 1503 may include storage gate 1504 that receives signal SG, temporary storage node 1505, first transfer transistor 1506 that receives signal TX1, second transfer transistor 1507 that receives signal TX2, and storage gate reset transistor 1508 that receives signal SG_RESET. Storage gate 1504 may be coupled between photodiode 1510 and temporary storage node 1505. Storage node 1505 may be a pinned storage node that is fully depletable (e.g., all charge may be removed from storage node 1505 during charge transfer). The coupled gate structure 1503 may work like a charge coupled device structure. Photodiode 1510 may be coupled to ground 1518. First transfer transistor 1506 may be coupled between temporary storage node 1505 and floating diffusion node (FD) 1514. There may be a capacitance ($C_{FD}$) 1516 between the floating diffusion node 1514 and ground 1518. Second transfer transistor 1507 may be coupled between temporary storage node 1505 and reset transistor 1512. Reset transistor 1512 may be coupled between second transfer transistor 1507 and pixel voltage supply 1522. Pixel voltage supply 1522 may receive voltage $V_{AA}$. Storage gate reset transistor 1508 may be coupled between pixel voltage supply 1522 and temporary storage node 1505. Dual-gain structure 1540 may include gain-select transistor 1528 and gain-select capacitor ($C_{GS}$) 1530. Gain-select transistor 1528 may be coupled between floating diffusion node 1514 and reset transistor 1512. One terminal of gain-select capacitor 1530 may be coupled between gain-select transistor 1528 and reset transistor 1512, while the other terminal of gain-select capacitor 1530 may be coupled to ground 1518. Source-follower transistor 1520 may be coupled between pixel voltage supply 1522 and row select transistor 1524. A gate terminal of source-follower transistor 1520 may be coupled to floating diffusion node 1514. Row select transistor 1524 may be coupled to column output line 1526.

Reset transistor 1512 may receive signal RESET, which may activate reset transistor 1512 during reset operations to pass voltage $V_{AA}$ to floating diffusion node 1514. Row select transistor 1524 may receive signal RS, which may activate row select transistor 1524 to transfer a voltage that corresponds to the charge on the floating diffusion node to column readout circuitry 1526 during readout operations. Gain-select transistor 1528 may receive signal GAIN_SELECT, which may activate gain-select transistor 1528 to connect gain-select capacitor 1530 to floating diffusion node 1514 to put the pixel in a low-gain configuration, or which may deactivate gain-select transistor 1528 to isolate gain-select capacitor 1530 from floating diffusion node 1514 to put the pixel in a high-gain configuration.

Figure 16:
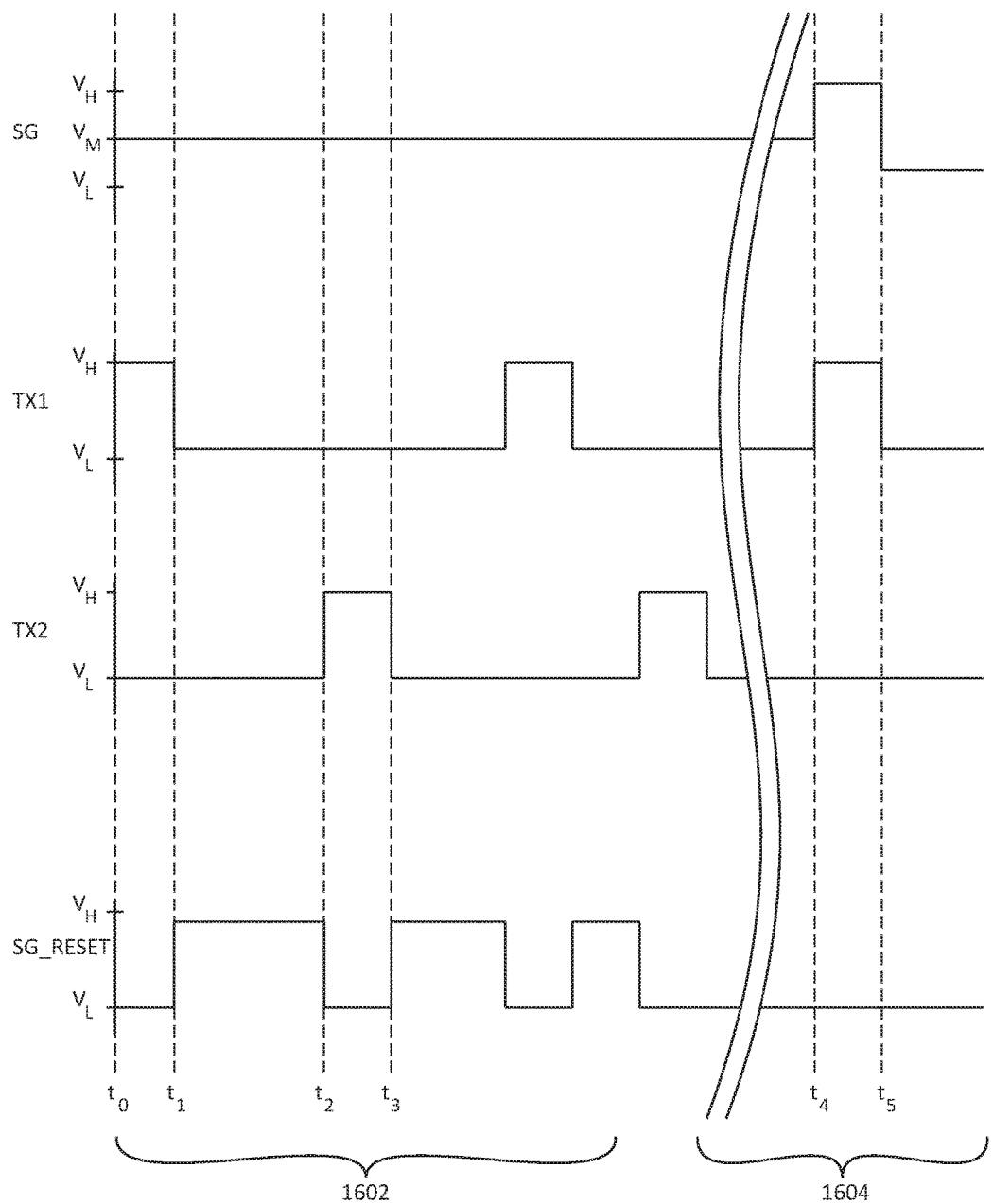
FIG. 16 is a timing diagram showing relevant signal behavior in an illustrative 4-transistor coupled gate structure in accordance with an embodiment.

FIG. 16 is a timing diagram showing relevant signal behavior that may be used in a 4-transistor coupled gate structure, such as the one shown in FIG. 15, for overflow charge routing and non-overflow charge transfer. Region 1602 of the timing diagram represents signal behavior during a portion of the charge accumulation period of a pixel photodiode. During the charge accumulation period, signal SG may be held at intermediate voltage level $V_M$, while signals TX1, TX2 and SG_RESET may respectively alternate between low and high voltage levels $V_L$ and $V_H$. It should be noted that whenever one of the signals TX1, TX2, and SG_RESET is high, then the other two signals will be low. For example, when signal SG_RESET is high, signals TX1 and TX 2 will be low. In other words, signals SG_RESET, TX1, and TX2 may have alternating non-overlapping waveforms during charge accumulation. For example, from time $t_0$ to $t_1$, signal TX1 is at $V_H$ while signals SG_RESET and TX2 are at $V_L$. From time $t_1$ to $t_2$, signal SG_RESET is at $V_H$ while signals TX1 and TX2 are at $V_H$. From time $t_2$ to $t_3$, signal TX2 is at $V_H$ while signals TX1 and SG_RESET are at $V_L$. The respective duty cycles of the TX1, TX2, and SG_RESET signals may be altered based on the portion of overflow charges desired to be routed to any of the three paths. The duty cycle may, for example, be set such that signal TX1 is 5% of a period, signal TX2 is 10% of a period and signal SG_RESET is on for the remaining 85% of the period. This example is merely illustrative and any desired duty cycle may be used for signals TX1, TX2, and SG_RESET. It should be noted that, during charge accumulation, signal TX1, signal TX2 and signal SG_RESET may be complementary signals or, if desired, there may be periods of time between assertions of signal TX1, signal TX2 and signal SG_RESET in which all three signals are deasserted.

Portion 1604 of the timing diagram represents signal behavior when non-overflow charges are transferred from the photodiode to storage. Portion 1604 may occur after the read out of overflow signals from the pixel. From time $t_4$ to time $t_5$, signals SG and TX1 may be set at $V_H$, while signals SG_RESET and TX2 are held low at $V_L$, such that non-overflow charge from the photodiode is only transferred along one desired path (e.g., through first transfer transistor 1506 in FIG. 15).

Figure 17:
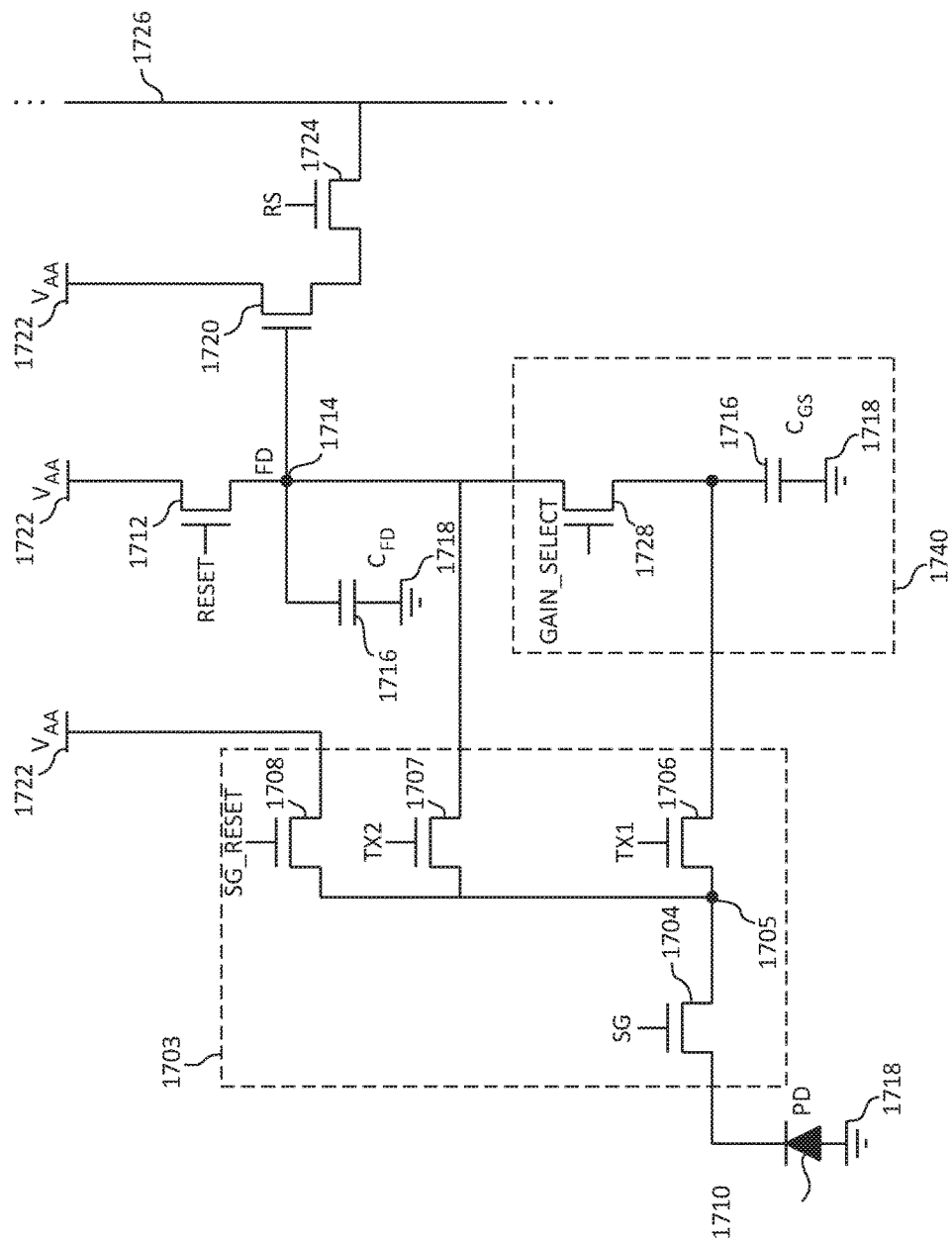
FIG. 17 is a diagram of an illustrative image sensor pixel circuit having a 4-transistor coupled gate structure in accordance with an embodiment.

FIG. 17 is a diagram of a pixel circuit that includes a 4-transistor coupled gate structure and that includes a dual-gain structure. Coupled gate structure 1703 may include storage gate 1704 that receives signal SG, temporary storage node 1705, first transfer transistor 1706 that receives signal TX1, second transfer transistor 1707 that receives signal TX2, and storage gate reset transistor 1708 that receives signal SG_RESET. Storage gate 1704 may be coupled between photodiode 1710 and temporary storage node 1705. Storage node 1705 may be a pinned storage node that is fully depletable (e.g., all charge may be removed from storage node 1705 during charge transfer). The coupled gate structure 1703 may work like a charge coupled device structure. Photodiode 1710 may be coupled to ground 1718. Second transfer transistor 1707 may be coupled between temporary storage node 1705 and floating diffusion node (FD) 1714. There may be a capacitance ($C_{FD}$) 1716 between the floating diffusion node 1714 and ground 1718. Reset transistor 1712 may be coupled between floating diffusion node 1714 and pixel voltage supply 1722. Pixel voltage supply 1722 may receive voltage $V_{AA}$. Storage gate reset transistor 1708 may be coupled between pixel voltage supply 1722 and temporary storage node 1705. Dual-gain structure 1740 may include gain-select transistor 1728 and gain-select capacitor ($C_{GS}$) 1730. First transfer transistor 1706 may be coupled between temporary storage node 1705 and gain-select transistor 1728. One terminal of gain-select capacitor 1730 may be coupled between gain-select transistor 1728 and first transfer transistor 1706, while the other terminal of gain-select capacitor 1730 may be coupled to ground 1718. Source-follower transistor 1720 may be coupled between pixel voltage supply 1722 and row select transistor 1724. A gate terminal of source-follower transistor 1720 may be coupled to floating diffusion node 1714. Row select transistor 1724 may be coupled to column output line 1726.

Signals SG, TX1, TX2, and SG_RESET may respectively behave according to the timing diagram for signals SG, TX1, TX2, and SG_RESET of FIG. 16. Reset transistor 1712 may receive signal RESET, which may activate reset transistor 1712 during reset operations to pass voltage $V_{AA}$ to floating diffusion node 1714. Row select transistor 1724 may receive signal RS, which may activate row select transistor 1724 to transfer a voltage that corresponds to the charge on the floating diffusion node to column readout circuitry 1726 during readout operations. Gain-select transistor 1728 may receive signal GAIN_SELECT, which may activate gain-select transistor 1728 to connect gain-select capacitor 1730 to floating diffusion node 1714 to put the pixel in a low-gain configuration, or which may deactivate gain-select transistor 1728 to isolate gain-select capacitor 1730 from floating diffusion node 1714 to put the pixel in a high-gain configuration.

Figure 18:
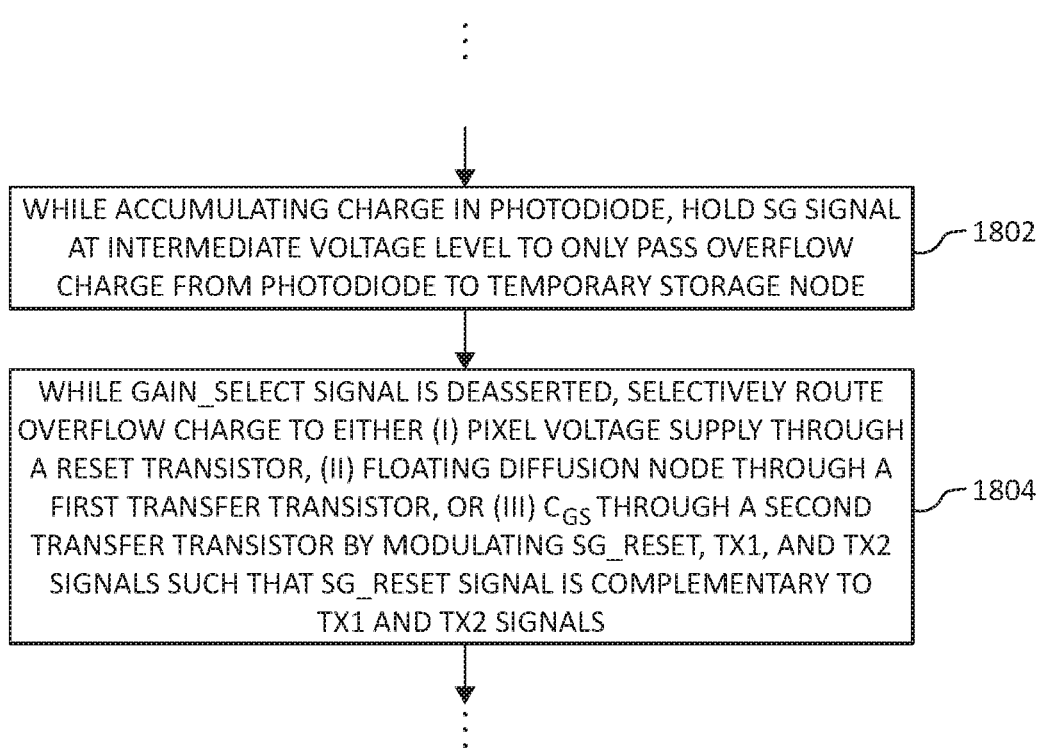
FIG. 18 is a flow chart of illustrative steps that may be performed by the image sensor pixels of FIGS. 15 and 17 to selectively route overflow charge from a photodiode during charge accumulation in accordance with an embodiment.

FIG. 18 is a flow chart of steps that may be performed in place of step 604 in FIG. 6 for selectively routing overflow charge while charge is accumulating in the photodiode. The flow chart of FIG. 14 may correspond to an image sensor pixel configuration such as those shown in FIGS. 15 and 17. In step 1802, signal SG may be held at an intermediate voltage level such that overflow charge is allowed to pass from photodiode 1510 through storage gate 1504 to temporary storage node 1505.

In step 1804, overflow charge may be selectively routed from temporary storage node 1504 either to pixel voltage supply 1522 through storage gate reset transistor 1508, to floating diffusion node 1514 through first transfer transistor 1506, or to gain-select capacitor 1530 through second transfer transistor 1507. This selective routing may be performed by modulating signal TX1, signal TX2, and SG_RESET such that the three signals alternate (e.g., when TX1 is high, TX2 and SG_RESET are low).

Figure 19:
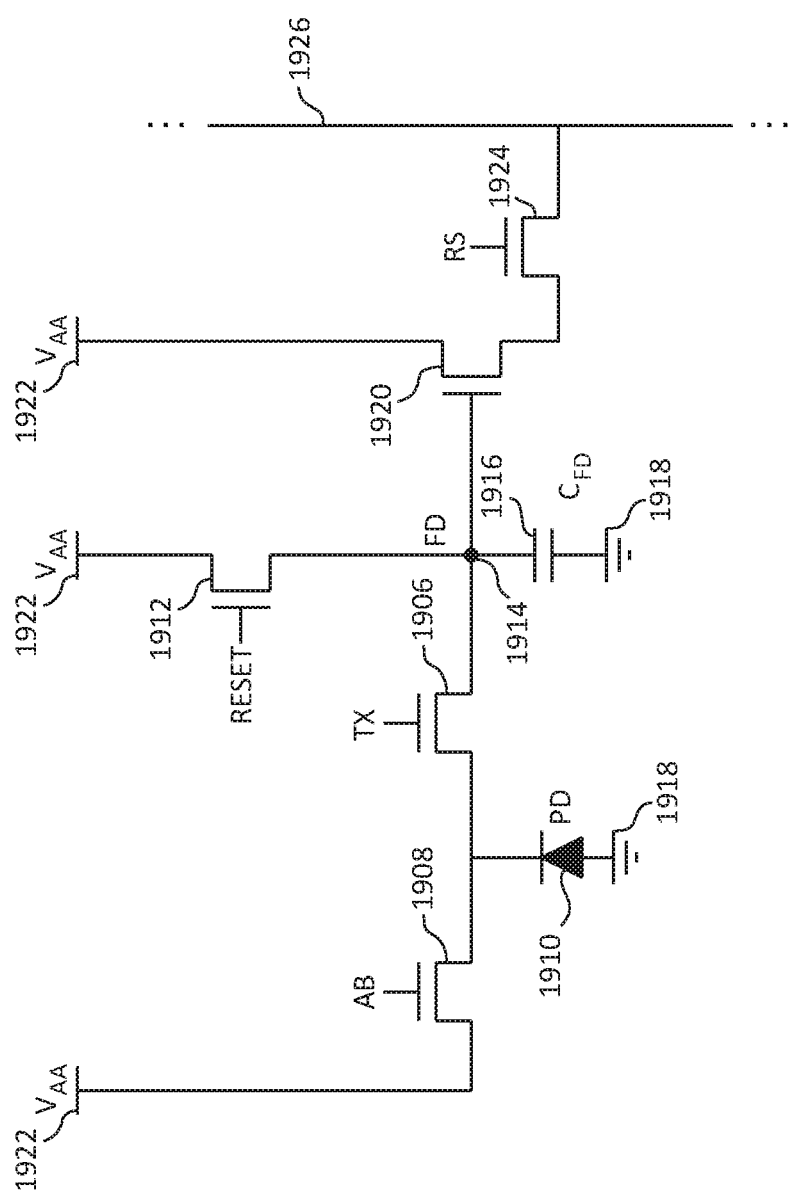
FIG. 19 is an illustrative image sensor pixel circuit having a 2-transistor coupled gate structure in accordance with an embodiment.

FIG. 19 is a diagram of a pixel circuit that includes a 2-transistor coupled gate structure. As shown in FIG. 19, a first terminal of photodiode 1910 may be coupled to ground 1918, while a second terminal of photodiode 1910 may be coupled between anti-blooming transistor 1908 and transfer transistor 1906. Transfer transistor 1906 may receive signal TX. Anti-blooming transistor 1908 may be coupled between photodiode 1910 and pixel voltage supply 1922. Pixel voltage supply 1922 may receive a voltage $V_{AA}$. A floating diffusion node (FD) 1914 may be coupled between transfer transistor 1906 and a gate of source-follower transistor 1920. There may be a capacitance ($C_{FD}$) 1916 between the floating diffusion node 1914 and ground 1918. Reset transistor 1912 may be coupled between pixel voltage supply 1922 and floating diffusion node 1914. Source-follower transistor 1920 may be coupled between pixel voltage supply 1922 and row select transistor 1924. Row select transistor 1924 may be coupled to column output line 1926.

Reset transistor 1912 may receive signal RESET, which may activate reset transistor 1912 during reset operations to pass voltage $V_{AA}$ to floating diffusion node 1914. Row select transistor 1924 may receive signal RS, which may activate row select transistor 1924 to transfer a voltage that corresponds to the charge on the floating diffusion node to column readout circuitry 1926 during readout operations.

Figure 20:
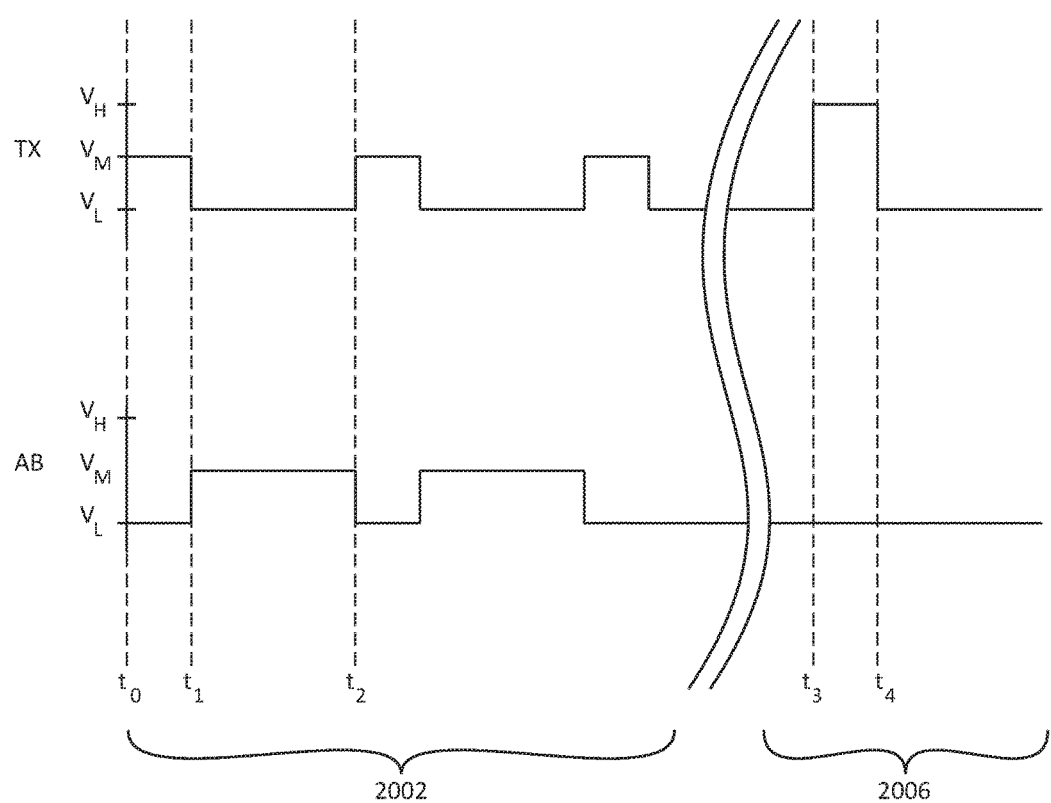
FIG. 20 is timing diagram showing relevant signal behavior in an illustrative 2-transistor coupled gate structure in accordance with an embodiment.

FIG. 20 is a timing diagram showing relevant signal behavior of a 2-transistor coupled gate structure of the type shown in FIG. 19 for overflow charge routing and non-overflow charge transfer. Region 2002 of the timing diagram represents signal behavior during a portion of the charge accumulation period of a pixel photodiode. During the charge accumulation period, signals TX and AB may alternate between respective low and intermediate voltage levels $V_L$ and $V_M$. It should be noted that signal TX may be at a low voltage whenever signal AB is at an intermediate voltage and vice-versa. In other words, signals AB and TX may have alternating waveforms during charge accumulation. For example, from time $t_0$ to $t_1$, signal TX is at $V_M$ and signal AB is at $V_L$. From time $t_1$ to $t_2$, signal AB is at $V_M$ and signal TX is at $V_L$. The duty cycle of the TX and AB signals may be altered based on the portion of overflow charges desired to be routed to either of the two paths. It should be noted that, during charge integration, signal TX and signal AB may be complementary signals or, if desired, there may be periods of time between assertions of signal TX and signal AB in which both signals are deasserted.

Portion 2004 of the timing diagram represents signal behavior when non-overflow charges are transferred from the photodiode to storage. Portion 2004 may occur after the read out of overflow signals from the pixel. From time $t_3$ to $t_4$, signal TX may be set at high voltage level $V_H$, while signal AB may be held low at $V_L$, such that non-overflow charge from the photodiode is only transferred along one desired path (e.g., through transfer transistor 1906 in FIG. 19).

Figure 21:
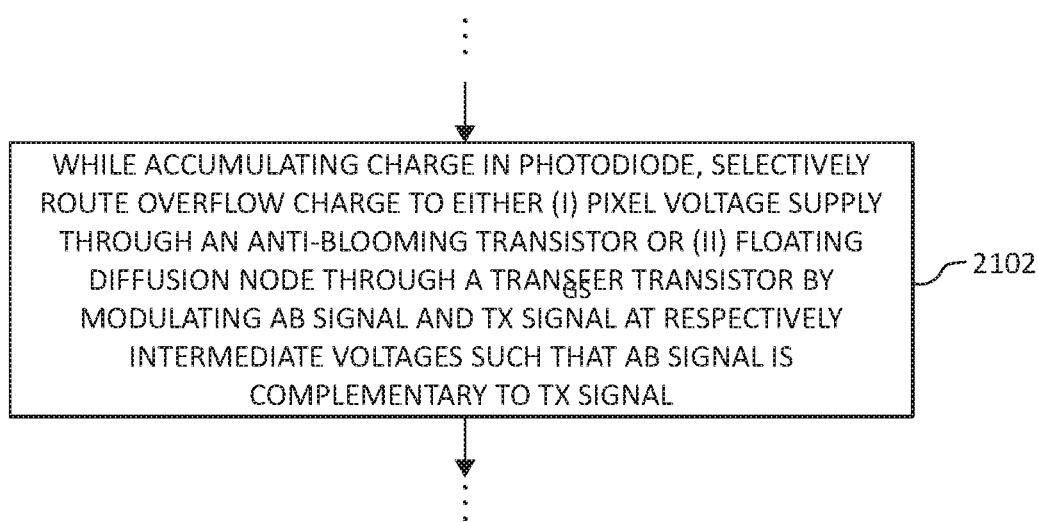
FIG. 21 is a flow chart of illustrative steps that may be performed by the image sensor pixel of FIG. 19 to selectively route overflow charge from a photodiode during charge accumulation in accordance with an embodiment.

FIG. 21 is a flow chart of a step that may be performed in place of step 604 in FIG. 6 for selectively routing overflow charge while charge is accumulating in the photodiode. The flow chart of FIG. 21 may correspond to an image sensor pixel configuration such as the one shown in FIG. 19. In step 2102, overflow charge may be selectively routed either to pixel voltage supply 1922 through anti-blooming transistor 1908 or to floating diffusion node 1914 through transfer transistor 1906 by modulating signal AB and signal TX at respectively intermediate voltages such that signal AB is only ever active when signal TX is inactive and vice-versa during charge integration. It should be noted that signal TX and signal AB may still be inactive at the same time during some intervals.

Figure 22:
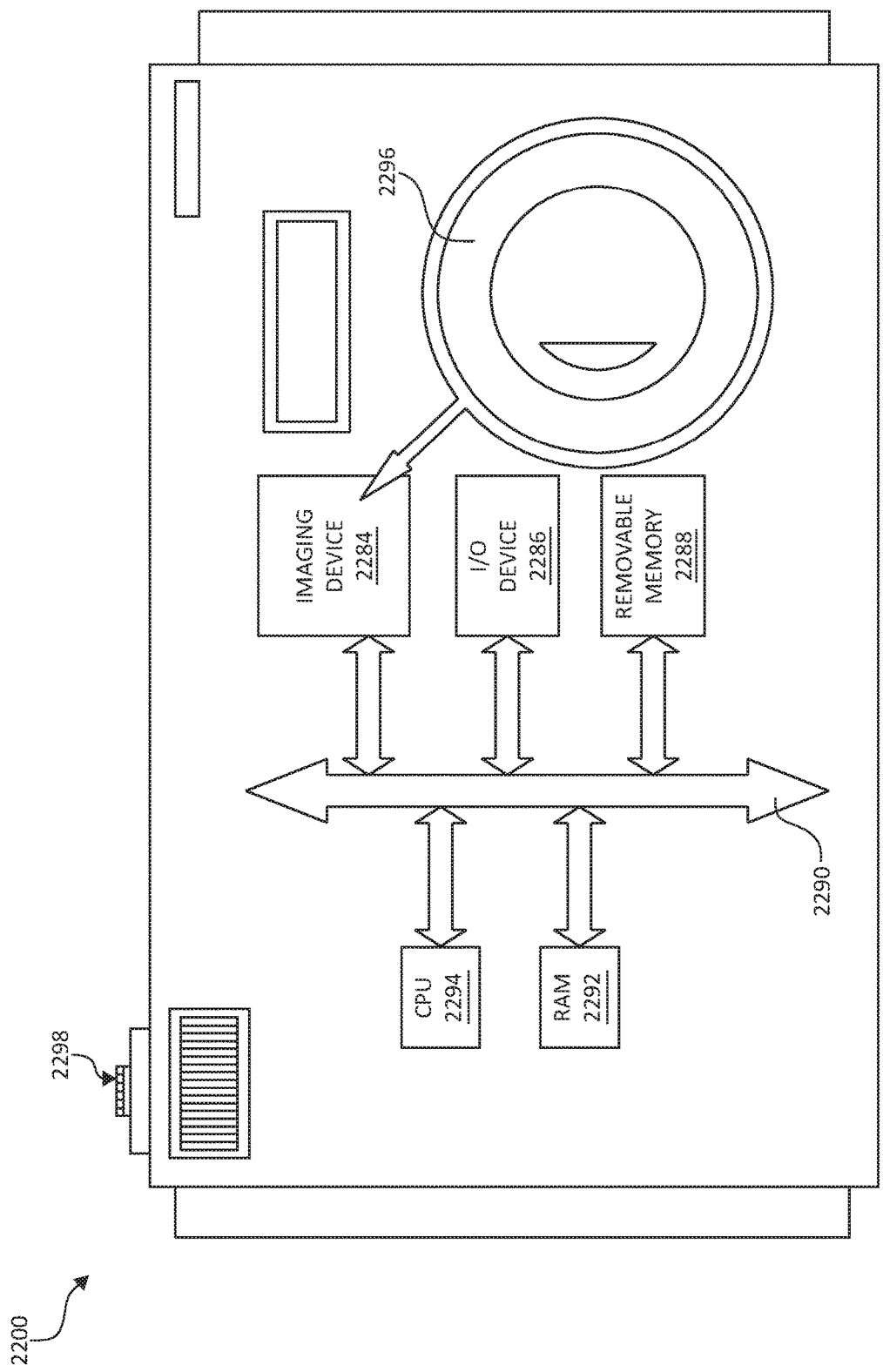
FIG. 22 is a block diagram of an imager that may employ the embodiments of FIGS. 1-21 in accordance with an embodiment.

FIG. 22 is a block diagram of a processor system employing at least some of the embodiments of the image pixel array in FIGS. 1-21. Device 2284 may comprise the elements of device 10 (FIG. 1) or any relevant subset of the elements. Processor system 2200 is exemplary of a system having digital circuits that could include imaging device 2284. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 2200, which may be a digital still or video camera system, may include a lens or multiple lenses indicated by lens 2296 for focusing an image onto an image sensor, image sensor array, or multiple image sensor arrays such as image sensor 16 (FIG. 1) when shutter release button 2298 is pressed. Processor system 2200 may include a central processing unit such as central processing unit (CPU) 2294. CPU 2294 may be a microprocessor that controls camera functions and one or more image flow functions and communicates with one or more input/output (I/O) devices 2286 over a bus such as bus 2290. Imaging device 2284 may also communicate with CPU 2294 over bus 2290. System 2200 may include random access memory (RAM) 2292 and removable memory 2288. Removable memory 2288 may include flash memory that communicates with CPU 2294 over bus 2290. Imaging device 2284 may be combined with CPU 2294, with or without memory storage, on a single integrated circuit or on a different chip. Although bus 2290 is illustrated as a single bus, it may be one or more buses or bridges or other communication paths used to interconnect the system components.

Various embodiments have been described illustrating image sensors that have pixels with coupled gate structures. Image sensors having pixels with coupled gate structures may be used in an imaging system such as an electronic device.

An electronic device may include a first node, a second node, and a coupled gate structure. The coupled gate structure may include a storage node, a threshold transistor coupled between the first node and the storage node, a first transistor coupled to the storage node, and a second transistor coupled between the storage node and the second node. A gate of the first transistor and a gate of the second transistor may be configured to receive alternating timing signals during a charge integration period, such that the first transistor is only active when the second transistor is inactive during the charge integration period, and the second transistor is only active when the first transistor is inactive during the charge integration period. The electronic device may further include a photodiode, where the first node is coupled between the photodiode and the threshold transistor. The second node may be a floating diffusion node. The storage node may be a fully depletable pinned storage node. The coupled gate structure may work like a charge coupled device structure.

In one embodiment, the first transistor may be coupled between the storage node and a pixel voltage supply. The electronic device may further include a third transfer transistor coupled to the storage node, a gains elect transistor coupled between the third transistor and the floating diffusion node, and a capacitor having a terminal coupled to the third transistor and to the gain select transistor.

In one embodiment, the electronic device may include a reset transistor coupled between the floating diffusion node and a pixel voltage supply, a gain select transistor coupled between the reset transistor and the floating diffusion node, a capacitor having a terminal coupled to the gain select transistor and the additional reset transistor. The first transistor may be coupled between the storage node and the floating diffusion node. A third transistor may be coupled between the floating diffusion node and the first transistor. An additional capacitor may have a terminal coupled to the first transistor and to the third transistor. The third transistor may be coupled to the floating diffusion node through the gain select transistor.

In one embodiment, the electronic device may include a reset transistor coupled between the floating diffusion node and a pixel voltage supply, a gain select transistor coupled between the reset transistor and the floating diffusion node, a capacitor having a terminal coupled to the gain select transistor and the additional reset transistor. The first transistor may be coupled between the storage node and the pixel voltage supply. A third transistor may be coupled between the storage node and the reset transistor. The gain select transistor may be coupled between the third transistor and the floating diffusion node.

A method of operating an image pixel may include accumulating charge with a photodiode during a charge accumulation period. Control signals of at least two parallel transistors may be modulated during the charge accumulation period, such that overflow charge may be transferred from the photodiode to one of at least two paths in alternating intervals.

In one embodiment, a first path of the at least two paths may be coupled to a pixel voltage supply. A second path of the at least two paths may be coupled to a floating diffusion node. The method may further include holding a storage gate at an intermediate voltage level during the charge accumulation period such that overflow charge is transferred from the photodiode to a fully depletable pinned storage node before the overflow charge is transferred to the one of at least two paths.

In one embodiment, control signals of at least three parallel transistors may be modulated during the charge accumulation period such that overflow charge is transferred to one of at least three paths in alternating intervals where, at most, one of the three parallel transistors is active at any given time. A first path of the at least three paths may be coupled to a pixel voltage supply. A second path of the at least three paths may be coupled to a floating diffusion node. A third path of the at least three paths may be coupled to a storage node that is different than the floating diffusion node.

In one embodiment, the control signals of the at least two parallel transistors may respectively alternate between a low voltage level and an intermediate voltage level.

An image pixel may include a photosensitive element, a pinned storage node that is fully depletable, an additional storage node, a first transistor coupled between the photosensitive element and the pinned storage node, a second transistor coupled between the pinned storage node and the additional storage node, and a reset transistor coupled between the pinned storage node and a pixel voltage supply. The second transistor and the reset transistor may be configured such that reset transistor activation and second transistor activation alternate while charge accumulates in the photosensitive element.

In one embodiment, the imaging pixel may include a floating diffusion node and a third transistor coupled between the floating diffusion node and the photosensitive element. The first transistor may be coupled between a gain select storage node and the pinned storage node. A gain select transistor may be coupled between the floating diffusion node and the gain select storage node.

In one embodiment, an additional reset transistor may be coupled between the additional storage node and the pixel voltage supply. The imaging pixel may include a floating diffusion node and a third transistor coupled between the floating diffusion node and the additional storage node. The second transistor may be coupled to the additional storage node through the floating diffusion node and the third transistor.

The foregoing is merely illustrative of the principles of this invention which can be practiced in other embodiments.

What is claimed is:
1. An electronic device comprising:
   a first node;
   a second node; and
   a coupled gate structure comprising:
      a storage node;
      a threshold transistor coupled between the first node and the storage node;
      a first transistor coupled to the storage node; and
      a second transistor coupled between the storage node and the second node, wherein a gate of the first transistor and a gate of the second transistor receive alternating timing signals during a charge integration period, such that the first transistor is only active when the second transistor is inactive during the charge integration period, the second transistor is only active when the first transistor is inactive during the charge integration period, and both the first transistor and the second transistor are active during the charge integration period.

2. The electronic device defined in claim 1, wherein the storage node is a fully depletable pinned storage node, wherein the second node is a floating diffusion node, and wherein the electronic device further comprises:
a photodiode, wherein the first node is coupled between the photodiode and the threshold transistor.

3. The electronic device defined in claim 2, wherein the first transistor is coupled between the storage node and a pixel voltage supply, and wherein the electronic device further comprises:
a third transistor coupled to the storage node;
a gain select transistor coupled between the third transistor and the floating diffusion node; and
a capacitor having a terminal coupled to the third transistor and to the gain select transistor.

4. The electronic device defined in claim 2, further comprising:
a reset transistor coupled between the floating diffusion node and a pixel voltage supply;
a gain select transistor coupled between the reset transistor and the floating diffusion node; and
a capacitor having a terminal coupled to the gain select transistor and to the reset transistor.

5. The electronic device defined in claim 4, wherein the first transistor is coupled between the storage node and the floating diffusion node.

6. The electronic device defined in claim 5, further comprising:
a third transistor coupled between the floating diffusion node and the first transistor; and
an additional capacitor having a terminal coupled to the first transistor and to the third transistor.

7. The electronic device defined in claim 6, wherein the third transistor is coupled to the floating diffusion node through the gain select transistor.

8. A method of operating an imaging pixel comprising:
with a photodiode, accumulating charge during a charge accumulation period;
during the charge accumulation period, modulating control signals of at least two parallel transistors such that overflow charge is transferred from the photodiode to one of at least two paths in alternating intervals, wherein modulating the control signals comprises activating each of the at least two parallel transistors at least once during the charge accumulation period.

9. The method defined in claim 8, wherein a first path of the at least two paths is coupled to a pixel voltage supply, and wherein a second path of the at least two paths is coupled to a floating diffusion node.

10. The method defined in claim 9, further comprising:
holding a storage gate at an intermediate voltage level during the charge accumulation period such that the overflow charge is transferred from the photodiode to a fully depletable pinned storage node before the overflow charge is transferred to the one of at least two paths.

11. The method defined in claim 8, wherein modulating control signals further comprises:
during the charge accumulation period, modulating control signals of the at least two parallel transistors and an additional transistor such that overflow charge is transferred to one of at least three paths in alternating intervals, wherein, at most, one of the two parallel transistors and the additional transistor is active at any given time in the charge accumulation period.

12. The method defined in claim 11, wherein a first path of the at least three paths is coupled to a pixel voltage supply, wherein a second path of the at least three paths is coupled to a floating diffusion node, and wherein a third path of the at least three paths is coupled to a storage node that is different than the floating diffusion node.

13. The method defined in claim 8, wherein the control signals of the at least two parallel transistors respectively alternate between a low voltage level and an intermediate voltage level.

14. An imaging pixel comprising:
a photosensitive element;
a floating diffusion node;
a pinned storage node that is fully depletable;
an additional storage node;
a first transistor coupled between the photosensitive element and the pinned storage node;
a second transistor coupled between the pinned storage node and the additional storage node;
a third transistor coupled between the floating diffusion node and the photosensitive element; and
a reset transistor coupled between the pinned storage node and a pixel voltage supply, wherein the second transistor and the reset transistor are configured such that reset transistor activation and second transistor activation alternate while charge accumulates in the photosensitive element.

15. The imaging pixel defined in claim 14, further comprising:
a gain select storage node, wherein the first transistor is coupled between the gain select storage node and the pinned storage node; and
a gain select transistor coupled between the floating diffusion node and the gain-select storage node.

16. The image pixel defined in claim 14, further comprising:
an additional reset transistor coupled between the additional storage node and the pixel voltage supply.

17. The image pixel defined in claim 16, wherein the second transistor is coupled to the additional storage node through the floating diffusion node and the third transistor.

* * * * *